US007688031B2

(12) United States Patent  
Asakura et al.

(10) Patent No.: US 7,688,031 B2
(45) Date of Patent: Mar. 30, 2010

(54) POWER SUPPLY INTERRUPTING APPARATUS USING A CONTACT UNIT TO SWITCH BETWEEN AN INTERRUPTED AND NON-INTERRUPTED STATE

(75) Inventors: Toshiyuki Asakura, Toyota (JP); Shigeo Yamaji, Toyota (JP)

(73) Assignee: Yazaki Corporation, Tokyo (JP)

( * ) Notice: Subject to any disclaimer, the term of this patent is extended or adjusted under 35 U.S.C. 154(b) by 601 days.

(21) Appl. No.: 11/447,060

(22) Filed: Jun. 6, 2006

(65) Prior Publication Data

US 2006/0284579 A1    Dec. 21, 2006

(30) Foreign Application Priority Data

Jun. 6, 2005    (JP) ............................ P2005-165660

(51) Int. Cl.
*H02J 7/00* (2006.01)

(52) U.S. Cl. ...................... 320/127; 320/124; 320/129

(58) Field of Classification Search ................ 320/127, 320/103, 104, 109, 124, 129, 146; 713/323
See application file for complete search history.

(56) References Cited

U.S. PATENT DOCUMENTS

| | | | | |
|---|---|---|---|---|
| 3,560,802 A | * | 2/1971 | Mountjoy et al. | ........... 361/196 |
| 3,732,539 A | * | 5/1973 | Easterly | ........................ 340/466 |
| 4,060,846 A | * | 11/1977 | Conn | ........................ 361/193 |
| 4,087,045 A | * | 5/1978 | Matthews | ................... 236/1 G |
| 4,234,840 A | * | 11/1980 | Konrad et al. | ................ 320/127 |
| 4,578,628 A | * | 3/1986 | Siwiak | ........................ 320/127 |
| 4,640,598 A | * | 2/1987 | Yoshida | ........................ 396/388 |
| 4,679,254 A | * | 7/1987 | Wiegel | ............................ 2/8.3 |
| 5,697,868 A | * | 12/1997 | Akeel | ........................ 475/179 |
| 7,309,966 B2 | * | 12/2007 | Wobben | ..................... 318/139 |
| 2002/0043946 A1 | * | 4/2002 | Yoshimura | ................ 318/139 |
| 2002/0057071 A1 | * | 5/2002 | Gohara et al. | ............... 320/112 |

FOREIGN PATENT DOCUMENTS

| | | |
|---|---|---|
| FR | 2873868 A1 | 2/2006 |
| JP | 8-279321 A | 10/1996 |
| JP | 10-70843 A | 3/1998 |
| JP | 11-263164 A | 9/1999 |
| JP | 11-334498 A | 12/1999 |
| JP | 2001-51639 A | 2/2001 |
| JP | 2002-304240 A | 10/2002 |
| JP | 2005-59712 A | 3/2005 |
| WO | 2006-024718 A1 | 3/2006 |

OTHER PUBLICATIONS

German Office Action dated Dec. 10, 2008.

* cited by examiner

*Primary Examiner*—Edward Tso
*Assistant Examiner*—Arun Williams
(74) *Attorney, Agent, or Firm*—Sughrue Mion, PLLC

(57) ABSTRACT

Provided is a power supply interrupting apparatus. The apparatus includes a switch, for switching between a first connection connecting a primary terminal and an output terminal and a second connection connecting a secondary terminal and the output terminal; a motor, which is driven by a current outputted from the output terminal; an interlock switch, which is driven to rotate by the motor so as to choose to feed or not to feed to the secondary terminal in accordance with a resultant rotational angle; and a contact unit, which is driven to rotate by the motor so as to switch the state of a current supplied from the battery to an interrupted or non-interrupted state.

6 Claims, 25 Drawing Sheets

POWER SUPPLY INTERRUPTING APPARATUS USING A CONTACT UNIT TO SWITCH BETWEEN AN INTERRUPTED AND NON-INTERRUPTED STATE

BACKGROUND OF THE INVENTION

1. Field of the Invention

The present invention relates to a power supply interrupting apparatus which interrupts a dark current of a battery installed on a vehicle such as an automobile, and more particularly, to a power supply interrupting apparatus which is made to interrupt a power supply in a simple operation.

2. Description of the Related Art

Various types of electronic components have been installed on motor vehicles produced in recent years. An onboard battery supplies a minute current (that is, dark current) to some of the electronic components even when the vehicle is parked with an engine turned off. Due to the battery supplying current to the electronic components when the engine is off, the voltage of the onboard battery is reduced when the engine is turned off for a long period of time, resulting in a state where the onboard battery is left uncharged, leading to a flat battery (that is, the overdischarge of the onboard battery).

To prevent such an incident, conventional practice is to disconnect a battery terminal from a battery, as shown in FIG. 25, when the vehicle is kept at rest for a long period of time, is put in a garage for repair, or to remove a fuse disposed upstream of a dark current consuming electronic control unit (hereinafter, referred to as "ECU"), as shown in FIG. 26, when the vehicle is transported on a transport vehicle.

There is known a vehicle power supply interrupting apparatus which requires manual operation to interrupt the electric continuity (refer to JP-A-8-279321). When the power supply interrupting apparatus is pushed down, the operating portion is designed to rotate 90 degrees by a coil spring incorporated within the apparatus, and a contact, engaged with the operating portion, moves to an OFF position in association with the rotation of the operating portion, while an indication mark on the operating portion indicates an "OFF" position. Due to this, the operator can visually recognize from the position of the indication mark that a power supply line has been opened.

In addition, when attempting to return the operating portion from the OFF position to an ON position, the operating portion is pushed down and rotated 90 degrees in a reverse direction to reach the ON position, and thereafter, the pressure applied to the operating portion is released.

However, the method of interrupting the power supply by disconnecting the battery terminal is dangerous and troublesome to users in general. In addition, the removal of the fuse is also troublesome work. Additionally, the power supply interrupting apparatus described in Patent Document No. 1 has the problem with operability.

SUMMARY OF THE INVENTION

The invention was made in the light of the aforesaid situations and an object thereof is to provide a power supply interrupting apparatus which is safe and easy to operate.

In order to accomplish the above object, a power supply interrupting apparatus will be provided according to respective aspects (1) to (4) of the invention as below.

(1) According to a first aspect of the invention, there is provided a power supply interrupting apparatus for interrupting a current supplied from a battery, including:

a switch for choosing a connection between a primary terminal, which is being fed, and an output terminal when an operating portion is operated and choosing a connection between a secondary terminal and the output terminal, when the action of the operating portion is released;

a motor which is driven by a current outputted from the output terminal;

an interlock switch which is rotated by the motor in order to choose whether or not to have the secondary terminal fed, depending on a resultant rotational angle; and a contact unit which is rotated by the motor to switch the state of a current supplied from the battery to an interrupted or non-interrupted state; wherein the motor is continuously driven from a time when the primary terminal is connected to the output terminal until the interlock switch chooses not to feed the secondary terminal, which is being connected to the output terminal when the operating portion of the switch is operated, and wherein the contact unit switches the state of a current supplied from the battery from the non-interrupted to the interrupted state or from the interrupted to the non-interrupted state while the motor is being driven continuously.

(2) According to a second aspect of the invention, there is provided a power supply interrupting apparatus as set forth in (1) above, further including a primary indicating unit which is illuminated by a current supplied from the battery via the contact unit.

(3) According to a third aspect of the invention, there is provided a power supply interrupting apparatus as set forth in (1) above, further including a secondary indicating unit which is illuminated by a branch current of a current outputted to the output terminal of the switch.

(4) According to a fourth aspect of the invention, there is provided a power supply interrupting apparatus as set forth in (2) or (3) above, wherein a switch not to be on at any time other than when a vehicle is parked is connected in series to the primary indicating unit or the secondary indicating unit.

By adopting the configuration described in (1) above, only by operating the operating portion of the switch (hereinafter, a "switch" will be referred to simply as "SW") for choosing a connection between the primary terminal, which is being fed, and the output terminal, when the operating portion is operated, and choosing a connection between the secondary terminal and the output terminal when the operation of the operating portion is released, the supply of current from the battery can be interrupted, or the interrupted supply of current can be resumed.

By adopting a configuration described in (2) above, it is possible to identify whether or not the power supply is being interrupted from the indication on the primary indicating unit.

By adopting a configuration described in (3) above, it is possible to identify whether or not the supply of driving current to the motor continues from the indication on the secondary indicating unit.

By adopting a configuration described in (4) above, the illumination period of the primary or secondary indicating unit can be limited so as to reduce the consumption of current.

In addition, in the event a one-push SW is adopted to make up the SW which is configured to choose a connection, as has been described above, between the primary terminal, which is being fed, and the output terminal, when the operating portion is operated, and to choose a connection between the secondary terminal and the output terminal when the operation of the operating portion is released, the supply of current from the battery can be interrupted, or the interrupted supply of current can be resumed preferably through an operation of only pushing the one-push SW.

According to the invention, the supply of current from the battery can be interrupted through the safe and simple operation.

DESCRIPTION OF THE PREFERRED EMBODIMENTS

Thus, the invention has been briefly described. Furthermore, details of the invention are clarified further by thoroughly reading the following description of the best mode for carrying out the invention by reference to the accompanying drawings.

First Embodiment

Figure 5:
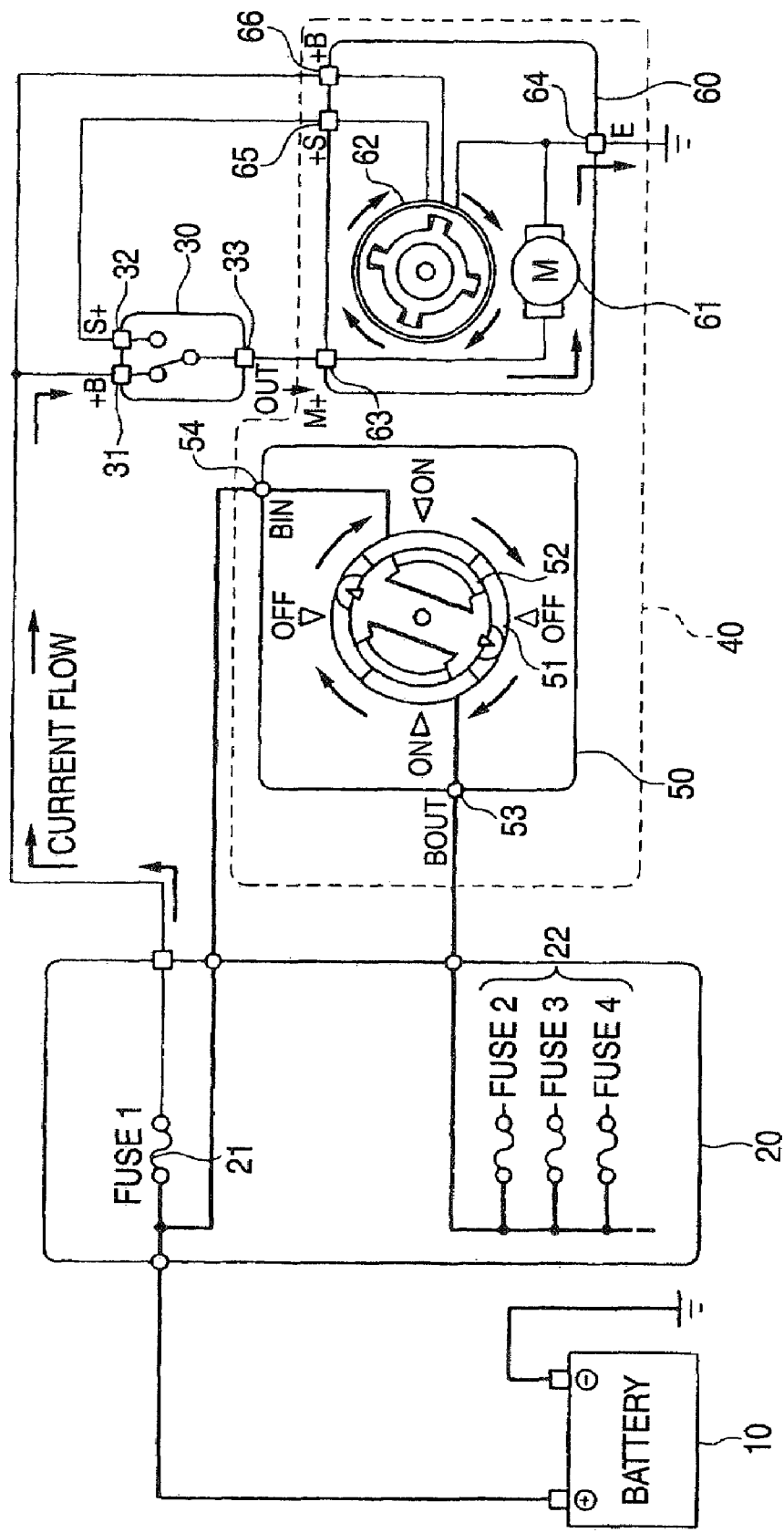
FIG. 5 is a drawing which shows a state of the first embodiment of the power supply interrupting apparatus according to the invention which results when the one-push SW is operated (off→on).
Figure 6:
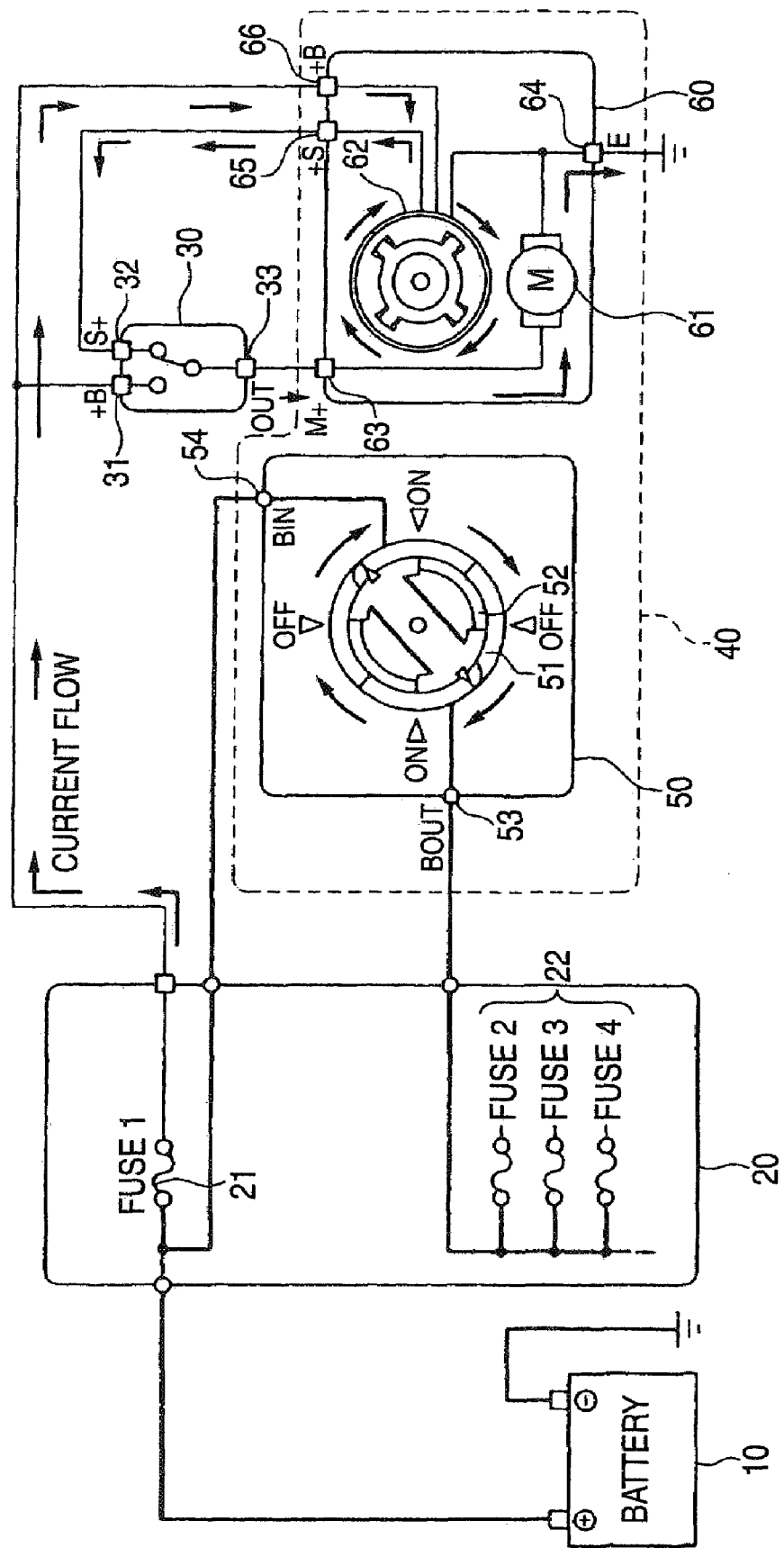
FIG. 6 is a drawing which shows a state of the first embodiment of the power supply interrupting apparatus according to the invention which results when the one-push SW has been operated (off→on).
Figure 7:
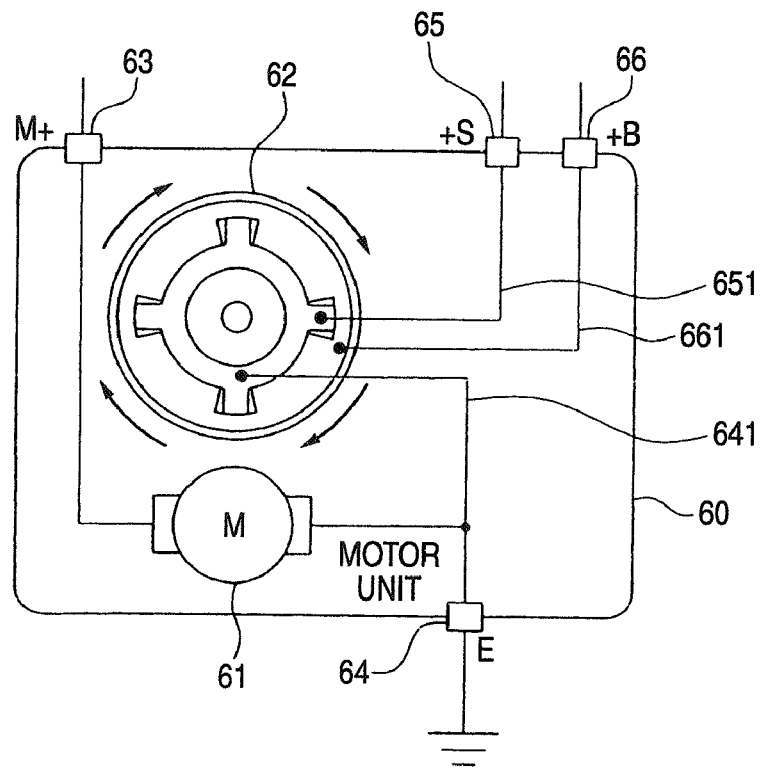
FIG. 7 is an enlarged view of a driving unit of the first embodiment of the power supply interrupting apparatus according to the invention.
Figure 8:
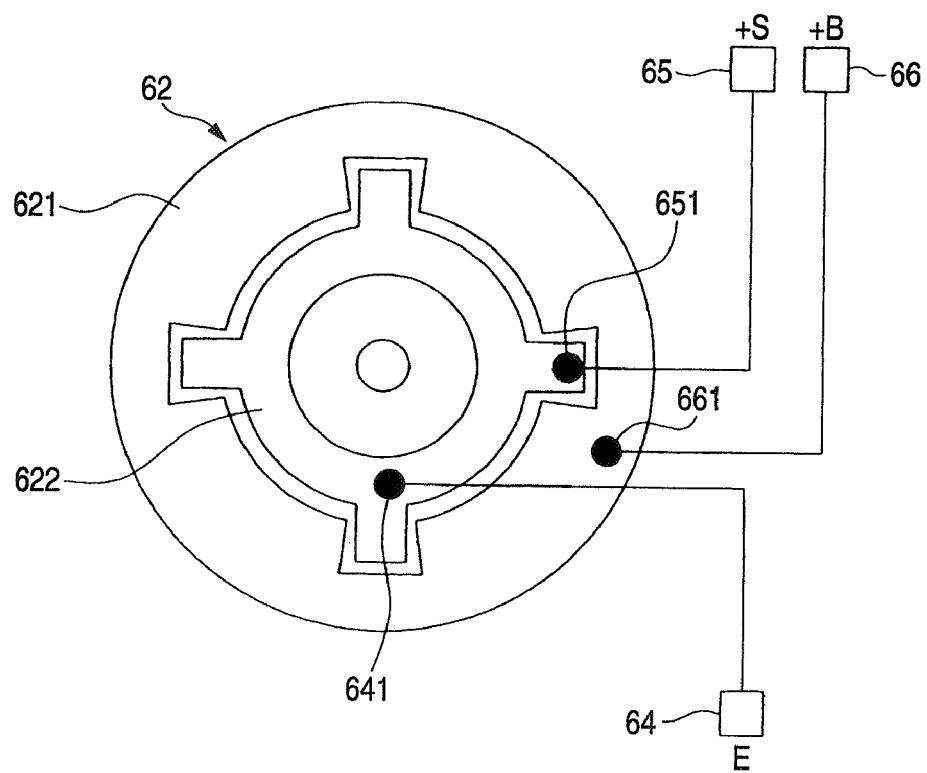
FIG. 8 is an enlarged view of an interlock SW of the first embodiment of the power supply interrupting apparatus according to the invention.
Figure 9:
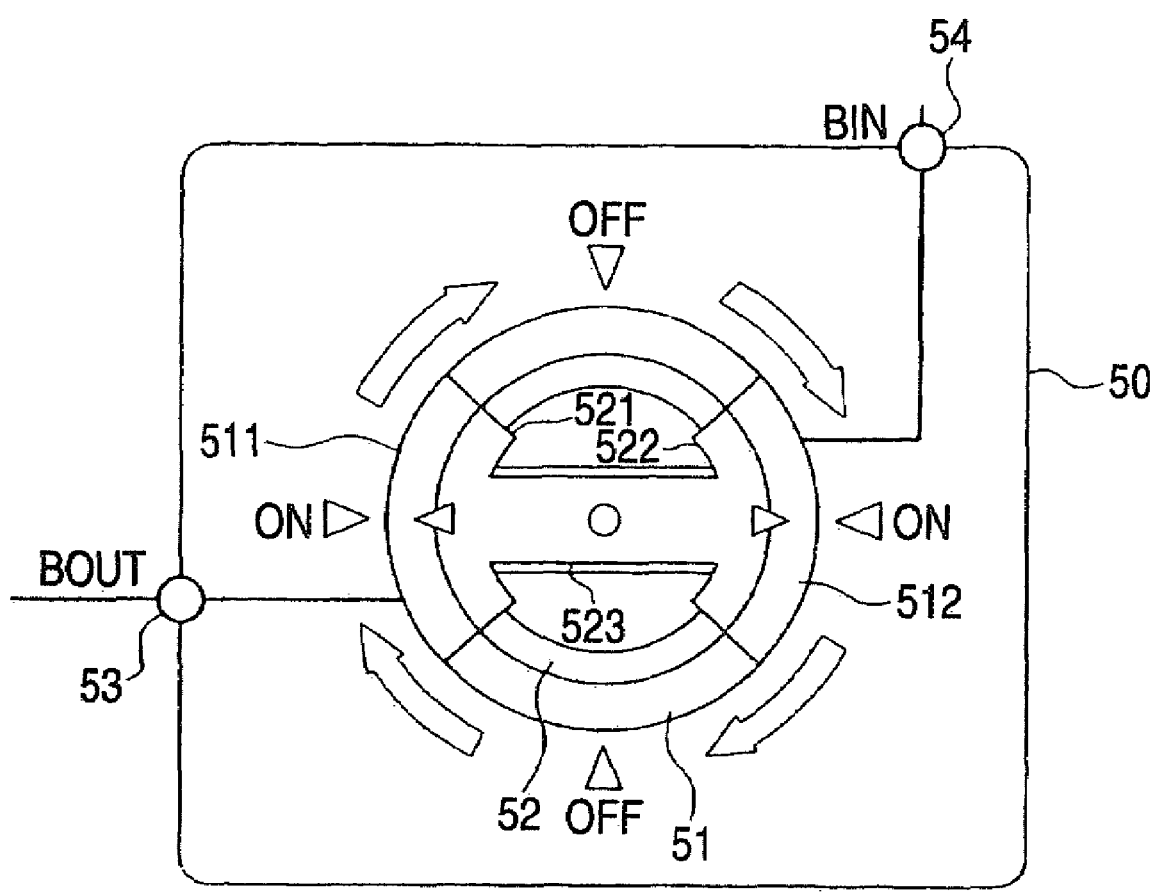
FIG. 9 is an enlarged view of a contact unit of the first embodiment of the power supply interrupting apparatus according to the invention.
Figure 10:
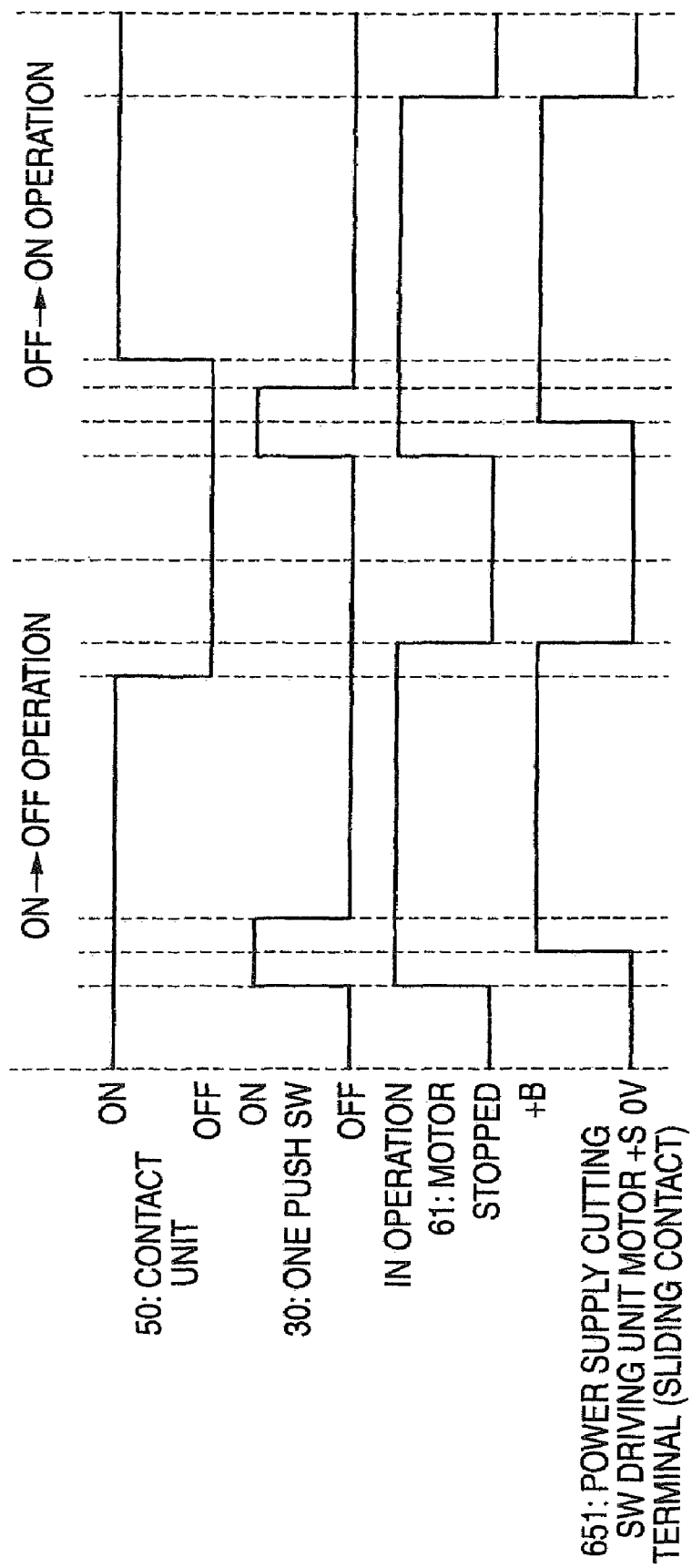
FIG. 10 is a timing chart which shows the operation of the first embodiment of the power supply interrupting apparatus according to the invention.

FIGS. 1 to 6 are drawings which show the configuration of a first embodiment of a power supply interrupting apparatus according to the invention, FIGS. 7 to 9 are drawings which show parts of the power supply interrupting apparatus in an enlarged fashion, and FIG. 10 is a timing chart which shows operation timings of the power supply interrupting apparatus. In addition, the states of the power supply interrupting apparatus at the operation timings are shown in FIGS. 1 to 6, respectively.

This power supply interrupting apparatus includes an onboard battery 10, a power supply box 20, a manually operated one-push SW 30, and a power supply cutting electric SW 40 which switches a power supply line on or off in response to the operation of the one-push SW 30.

The power supply box 20 accommodates therein a group of power supply cutting fuses 22 which are inserted into the power supply line to the ECU, which can interrupt a dark current, and a group of fuses 21, unable to cut power supply, which are inserted into the feeding line to the one-push SW 30 and the power supply cutting electric SW 40.

The one-push SW 30 includes a +B terminal 31 to which a supply power is inputted from the onboard battery 10, an S+ terminal 32 to which a supply power is inputted from the power supply cutting electric SW 40 and an OUT terminal 33 which outputs a supply power to the power supply cutting electric SW 40.

The one-push SW 30 has a plurality of electric contacts and an electric contact member adapted to make contact with or be separated from the electric contacts which are configured such that the +B terminal 31 and the OUT terminal 33 are electrically connected (that is, an established electric continuity) when the operating portion (not shown) of the one-push SW 30 is pushed (that is, pressed), while the S+ terminal 32 and the OUT terminal 33 are electrically connected to each other (that is, an established electric continuity) when the operation of the operating portion is released.

The power supply cutting electric SW 40 includes a driving unit 60 for driving a motor 61 in response to the operation of the one-push SW 30 and a contact unit 50 which is driven to switch contact points by the driving unit 60.

As shown in FIG. 7, the driving unit 60 includes the motor 61, an interlock SW 62 which is rotated by the motor 61, an M+ terminal 63 to which a supply power is inputted from the OUT terminal 33 of the one-push SW 30, an E terminal 64 by which the motor 61 and the power supply cutting electric SW 40 are earthed, a +B terminal 66 to which the supply power is inputted from the onboard battery 10, and a +S terminal 65 which outputs a supply power to the one-push SW 30.

The M+ terminal 63 outputs the supply power inputted from the one-push SW 30 to the motor 61.

The M+ terminal 63 includes, as shown in FIG. 8, an outer portion 621 and an inner portion 622 which are rotated together by the motor 61. Both the outer and inner portions are insulated from each other. The ring-shaped inner portion 622 has projecting portions provided at four locations, and the ring-shaped outer circumferential portion 621 has recessed portions in such a manner as to avoid contact with the projecting portions.

Normally, a sliding contact (an E portion in the driving unit) 641, which electrically connects to (that is, establishes an electric continuity with) the E terminal 64 of the interlock switch 62, electrically connects to the inner portion 622 irrespective of the rotational angle of the interlock SW 62. In addition, normally, a sliding contact (a+B portion in the driving unit) 661 which electrically connects to (that is, establishes an electric continuity with) the +B terminal 66, electrically connects to the outer portion 621 irrespective of the rotational angle of the interlock SW 62. In contrast, a sliding contact (a +S portion in the driving unit) 651 which electrically connects to (that is, establishes an electric continuity with) the +S terminal 65, electrically connects to the inner portion 622 or the outer portion 621 when the rotational angle of the interlock SW 62 has reached a predetermined rotational angle.

The contact unit 50 includes, as shown in FIG. 9, a ring-shaped stator 51, a rotor 52 which is rotated together with the interlock SW 62 by the motor 61, a BIN terminal 54 which electrically connects to (that is, establishes an electric continuity with) the power supply line from the onboard battery 10, and a BOUT terminal 53 which outputs the supply power to the power supply line to the ECU which can interrupt a dark current.

The stator 51 has an arc-shaped contact which electrically connects to (that is, establishes an electric continuity with) the BIN terminal 54 and an arc-shaped contact 511 which electrically connects to (that is, establishes an electric continuity with) the BOUT terminal 53 at spaced apart symmetrical positions. The rotor 52 has two arc-shaped terminals 521, 522 which are disposed at spaced apart symmetrical positions and a conducting element 523, which establishes an electric continuity between the contacts.

In addition, indication marks are designated on the arc-shaped contacts 521, 522 of the rotor 52. When these indication marks are directed to "ON" positions on a substrate, since either of the arc-shaped contacts 521, 522 of the rotor 52 can be in contact with the arc-shaped contact 512 of the stator 51, while the other is in contact with the arc-shaped contact 511 of the stator 51, an electric continuity is established between the BIN terminal 54 and the BOUT terminal 53, whereby supply power from the battery 10 is outputted through the BOUT terminal 53.

In contrast, when the indication marks of the rotor 52 are directed to indications of "OFF" on the substrate, since neither of the arc-shaped contacts 521, 522 of the rotor 52 contacts either of the arc-shaped contacts 511, 512 of the stator 51, the electric connection between the BIN terminal 53 and the BOUT terminal 53 is broken (that is, the electric continuity is lost), whereby the power supply is stopped.

Next, the operation of the apparatus will be described.

Figure 1:
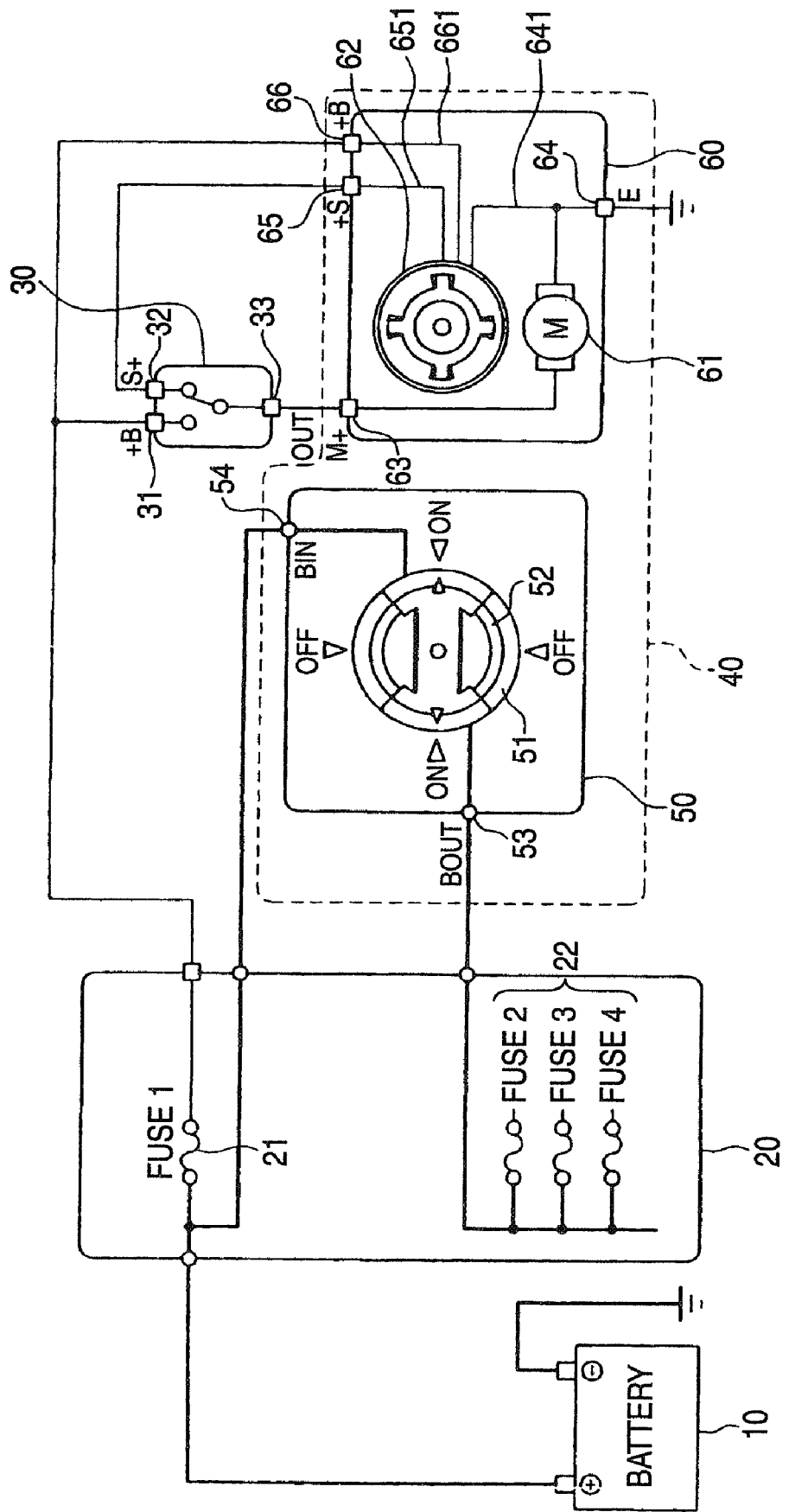
FIG. 1 is a drawing which shows a state of a first embodiment of a power supply interrupting apparatus according to the invention which results before the apparatus is operated.

At the stage before the one-push SW 30 is operated, the indication marks of the rotor 52 of the contact unit 50 are directed to the "ON" positions, as shown in FIG. 1. In this event, a large current supplied from the onboard battery 10 flows in the order: the onboard battery 10→the power supply box 20→the contact unit 50→the power supply box 20→the power supply cutting fuse group 21.

As this occurs in the one-push SW 30, an electric continuity is established between the BOUT terminal 33 and the +S terminal 65. In this event, one of the power input terminals of the motor 61 electrically connects to (that is, establishes an electric continuity with) a GND (ground) via the E terminal 64, and the other power input terminal of the motor 61 also electrically connects to (that is, establishes an electric continuity with) the GND via the next path.

Namely, the current flows in the order: the +M terminal 63 of the driving unit 60→the OUT terminal 33 of the one-push SW 30→the S+ terminal 32→the +S terminal 65 of the driving unit 60 →the +S portion in the driving unit (FIG. 8)→the inner portion 622 of the interlock switch 62→the E portion in the driving unit (FIG. 8)→the E terminal 64.

Due to this, the potentials of the power input terminals of the motor 61 come to the same level (that is, the level of GND), whereby the motor 61 is stopped.

Figure 2:
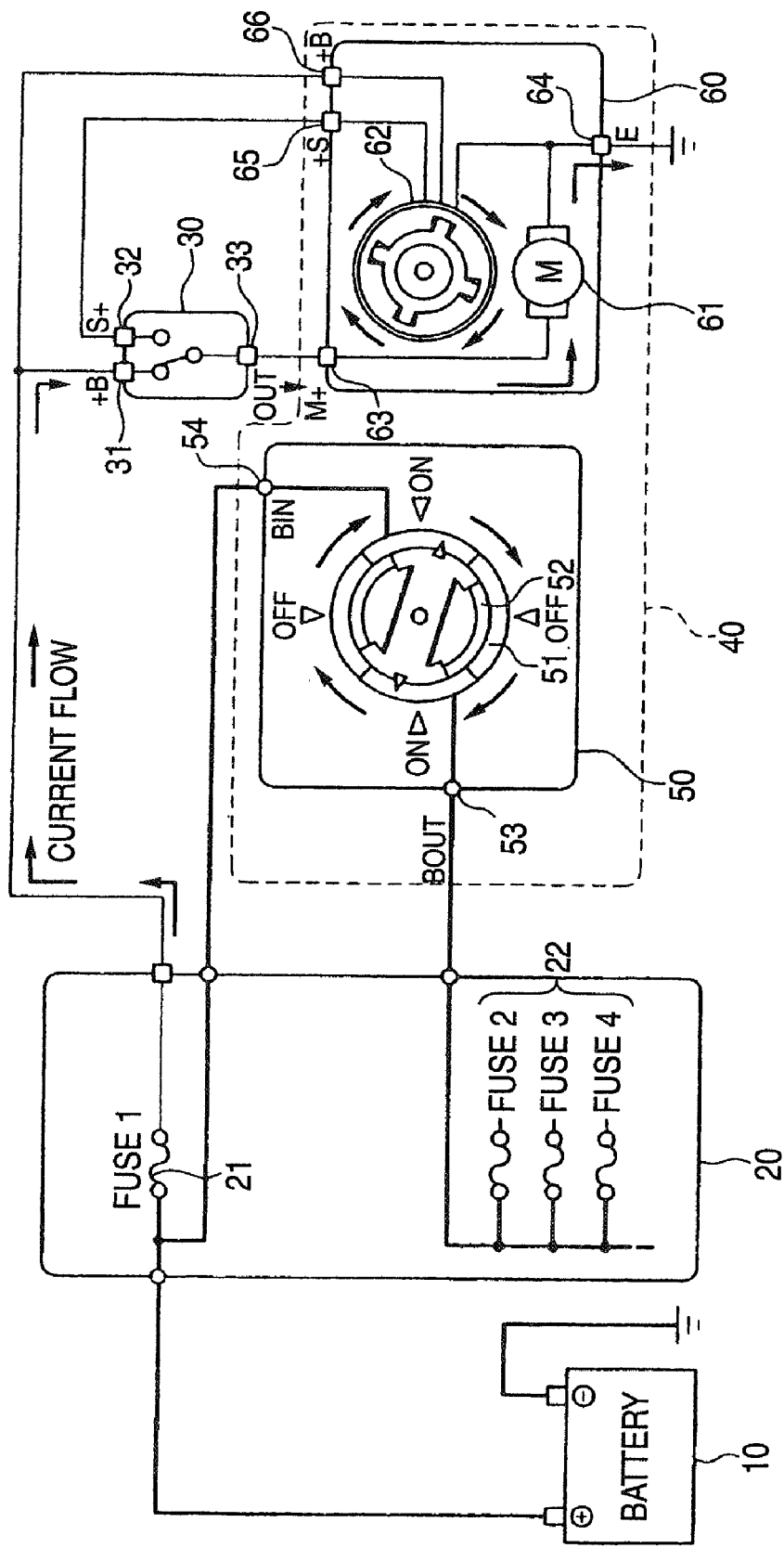
FIG. 2 is a drawing which shows a state of the first embodiment of the power supply interrupting apparatus according to the invention which results when a one-push SW is operated (on→off).

When the one-push SW 30 is operated from this state, as shown in FIG. 2, the one-push SW 30 establishes an electric continuity between the +B terminal 31 and the OUT terminal 33, whereby a driving current supplied from the onboard battery 10 flows in the order: the +B terminal 31→the OUT terminal 33→the M+ terminal 63 of the driving unit 60→the motor 61→the E terminal 64→GND, and the motor 60 starts to rotate. The interlock SW 62 and the rotor 52 of the contact unit 50 start to rotate in an interlocking fashion by virtue of the rotation of the motor 61, thus triggering the contact to switch from on to off in the contact unit 50.

Figure 3:
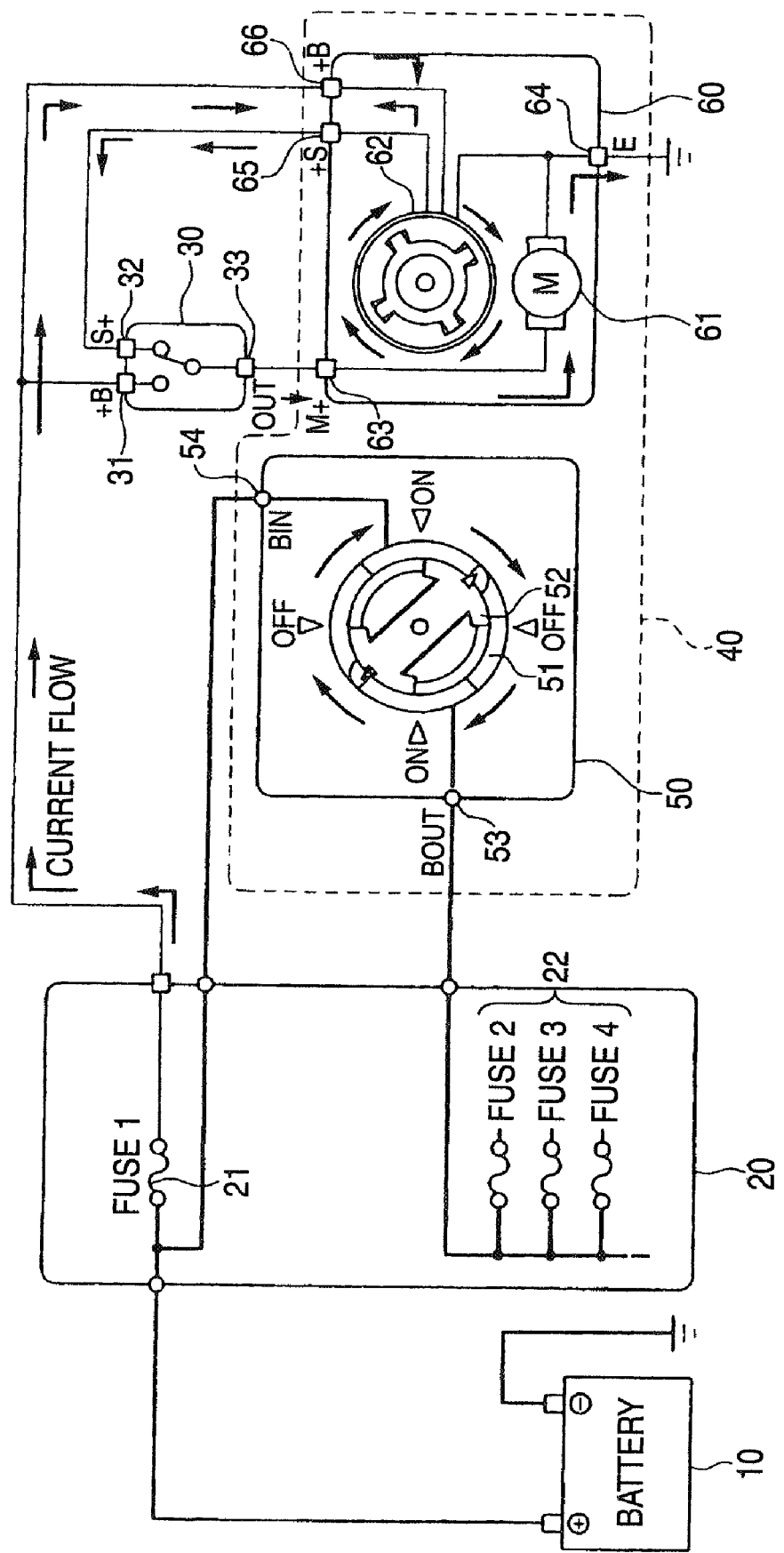
FIG. 3 is a drawing which shows a state of the first embodiment of the power supply interrupting apparatus according to the invention which results when the one-push SW has been operated (on→off).

Next, when the operation of the one-push SW 30 is completed, as shown in FIG. 3, the one-push SW 30 establishes an electric continuity between the S+ terminal 32 and the OUT terminal 33. In addition, the +S portion in the driving unit shown in FIG. 8 electrically connects to (that is, establishes an electric continuity with) the outer portion 621 by virtue of the rotation of the interlock SW 62 that was performed previously. Due to this, the driving current supplied from the onboard battery 10 flows in the order: the +B terminal 66 of the driving unit 60→the +B portion 661 in the driving unit (FIG. 8)→the +S portion 651 in the driving position (FIG.

8)→the +S terminal 65→the S+ terminal 32 of the one-push SW 30→the OUT terminal 33→the M+ terminal 63 of the driving unit 60→the motor 61→the E terminal 64→GND, and the motor 61 continues to rotate. Because of this, the interlock SW 62 and the rotor 52 of the contact unit 50 continue to rotate in an interlocking fashion.

Figure 4:
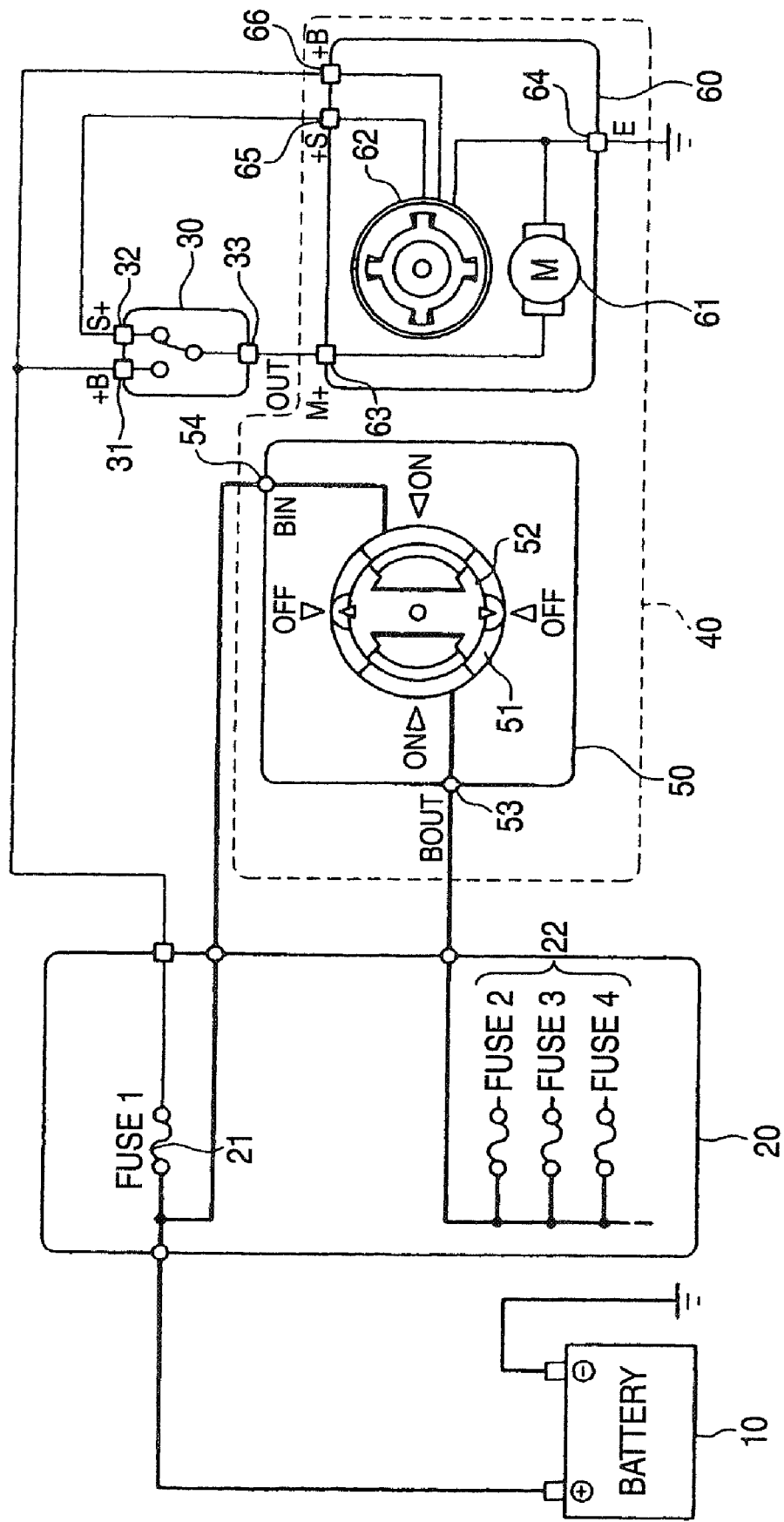
FIG. 4 is a drawing which shows a state of the first embodiment of the power supply interrupting apparatus according to the invention which results when the operation of the apparatus has been completed (on→off).

When the motor 61 rotates further, the interlock SW 62 rotates as shown in FIG. 4, and the +S portion 651 in the driving unit shown in FIG. 8 electrically connects to (that is, establishes an electric continuity with) the inner portion 622 of the interlock SW 62 again. Due to this, the electric connection between the +S portion 651 in the driving unit and the +B portion 661 in the driving unit is cut (that is, the electric continuity is lost), and the +S portion 651 in the driving unit electrically connects to (that is, establishes an electric continuity with) the E portion 641 in the driving unit via the inner portion 622 of the interlock SW 62.

Consequently, similar to the case illustrated in FIG. 1, one of the power input terminals of the motor 61 electrically contacts to (that is, establishes an electric continuity with) the GND via the E terminal 64, and the other power input terminal of the motor 61 electrically connects to (that is, establishes an electric continuity with) the M+ terminal 63 of the driving unit 60, the OUT terminal 33 of the one-push SW 30, the S+ terminal 32, the +S terminal 65 of the driving unit 60, the +S portion 651 in the driving unit (FIG. 8), the inner portion 622 of the interlock SW 62, the E portion 641 in the driving unit (FIG. 8) and GND via the E terminal 64. Due to this, the potentials of the power input terminals of the motor 61 come to the same level (that is, the level of GND), whereby the motor 61 is stopped.

As this occurs, the rotor 52 of the contact unit 50 stops due to the motor 61 coming to a halt in such a state that the indication marks on the rotor 52 are kept directed to the "OFF" positions on the substrate. Due to this, the electric connection between the BIN terminal 54 and the BOUT terminal 53 is broken (that is, the electric continuity is lost), and the power supply to the power supply box 20 is interrupted.

Thus, in the power supply interrupting apparatus, when the one-push SW 30 is pushed once, the interlock SW 62 and the rotor 52 of the contact unit 50 rotate by one fourth the circumference thereof, whereby the contact unit 50 is switched from on to off. Due to this, the large current outputted from the onboard battery 10 is interrupted at the contact unit 50.

When the one-push SW 30 is pushed again from this state, as shown in FIG. 5, an electric connection (that is, an electric continuity) is established between the +B terminal 31 and the OUT terminal 33 of the one-push SW 30. As a result, similar to the case illustrated in FIG. 2, the driving current supplied from the onboard battery 10 flows in the order: the +B terminal 31→the OUT terminal 33→the M+ terminal 63 of the driving unit 60→the motor 61→the E terminal 64→GND, whereby the motor 61 starts to rotate, and the interlock SW 62 and the rotor 52 of the contact unit 50 start to rotate in an interlocking fashion by virtue of the rotation of the motor 61, triggering the contact to switch from off to on in the contact unit 50.

Next, when the operation of the one-push SW 30 is completed, and as shown in FIG. 6, an electric connection (that is, an electric continuity) is established between the S+ terminal 32 and the OUT terminal 33 of the one-push SW 30, and similar to the case illustrated in FIG. 3, the driving current supplied from the onboard battery 10 flows in the order: the +B terminal 66 of the driving unit 60→the +B portion 661 in the driving unit (FIG. 8)→the +S portion 651 in the driving position (FIG. 8)→the +S terminal 65→the S+ terminal 32 of the one-push SW 30→the OUT terminal 33→the M+ terminal 63 of the driving unit 60→the motor 61→the E terminal 64→GND, whereby the motor 61 continues to rotate. Due to this, the interlock SW 62 and the rotor 52 of the contact unit 50 continue to rotate in an interlocking fashion.

When the motor 61 rotates further, the interlock SW 62 rotating one fourth the circumference thereof from a position shown in FIG. 4, the +S portion 651 in the driving unit electrically connects to the inner portion 622 of the interlock SW 62, and, similar to the case illustrated in FIG. 1, the potentials of the power input terminals of the motor 61 come to the same level (that is, the level of GND), whereby the motor 61 stops rotating.

As this occurs, the rotor 52 of the contact unit 50 stops rotating due to the motor 61 coming to a halt in such a state that the indication marks on the rotor 52 are kept directed to the "ON" positions on the substrate. Because of this, an electric connection (that is, an electric continuity) between the BIN terminal 54 and the BOUT terminal 53 is established, and the large current supplied from the onboard battery 10 flows in the order: the onboard battery 10→the power supply box 20→the contact unit 50→the power supply box 20→the power supply cutting fuse group 21.

Thus, in the power supply interrupting apparatus, when the one-push SW 30 is pushed to a point in which the current is interrupted, the interlock SW 62 and the rotor 52 of the contact unit 50 rotate by one fourth the circumference thereof, and the state of the contact unit 50 is switched from off to on. Due to this, the large current output from the onboard battery 10 travels to the supply box 20 via the contact unit 50.

A timing chart shown in FIG. 10 illustrates the operation timings of the power supply interrupting apparatus. The motor 61 is activated by operating the one-push SW 30, making the interlock SW 62 and the contact unit 50 rotate. When the interlock SW 62 rotates and the +S portion 651 in the driving unit is brought into contact with the inner portion 622 of the interlock SW 62, the potential of the +S portion 651 in the driving unit comes to the level of GND, and the motor 61 comes to a halt. The contact unit 50 is switched from on to off or from off to on by virtue of the driving of the motor 61 during that period of time.

According to the power supply interrupting apparatus of the invention, the power supply from the onboard battery 10 can be stopped and resumed through a simple operation of pushing the one-push SW 30. This one-push SW 30 does not have to be continually pushed and hence provides extremely good operability. The user can visually recognize whether the power supply is interrupted or connected by looking at the indication marks on the contact unit 50. In addition, this power supply interrupting apparatus can be operated safely while interrupting the power supply when a vehicle is serviced or is kept at rest for a long period of time. Additionally, there is no limitation on where to install the one-push SW 30, and hence, the one-push SW 30 can be placed at a location convenient to the user.

Second Embodiment

Figure 15:
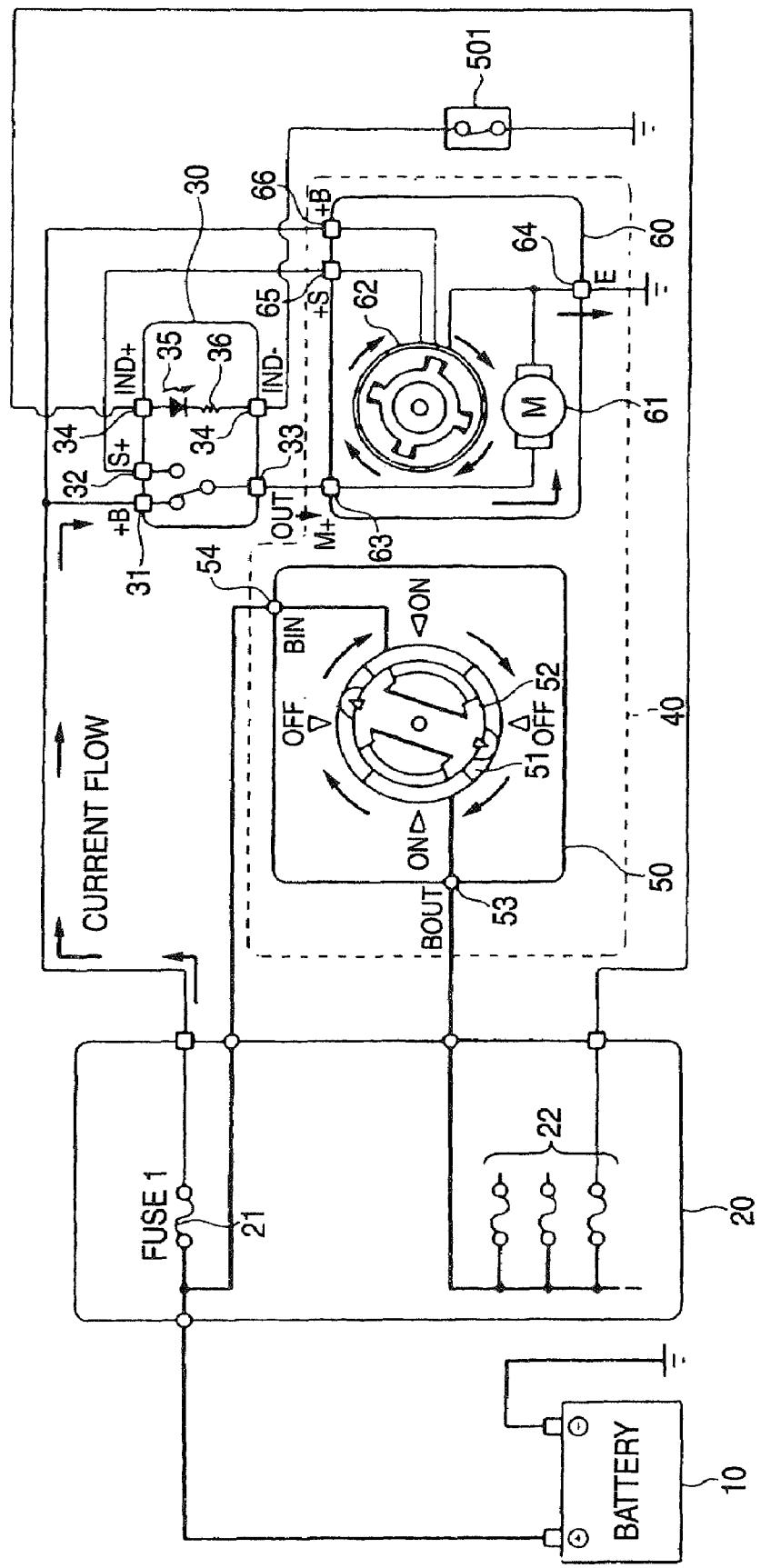
FIG. 15 is a drawing which shows a state of the second embodiment of the power supply interrupting apparatus according to the invention which results when the one-push SW is operated (off→on).
Figure 16:
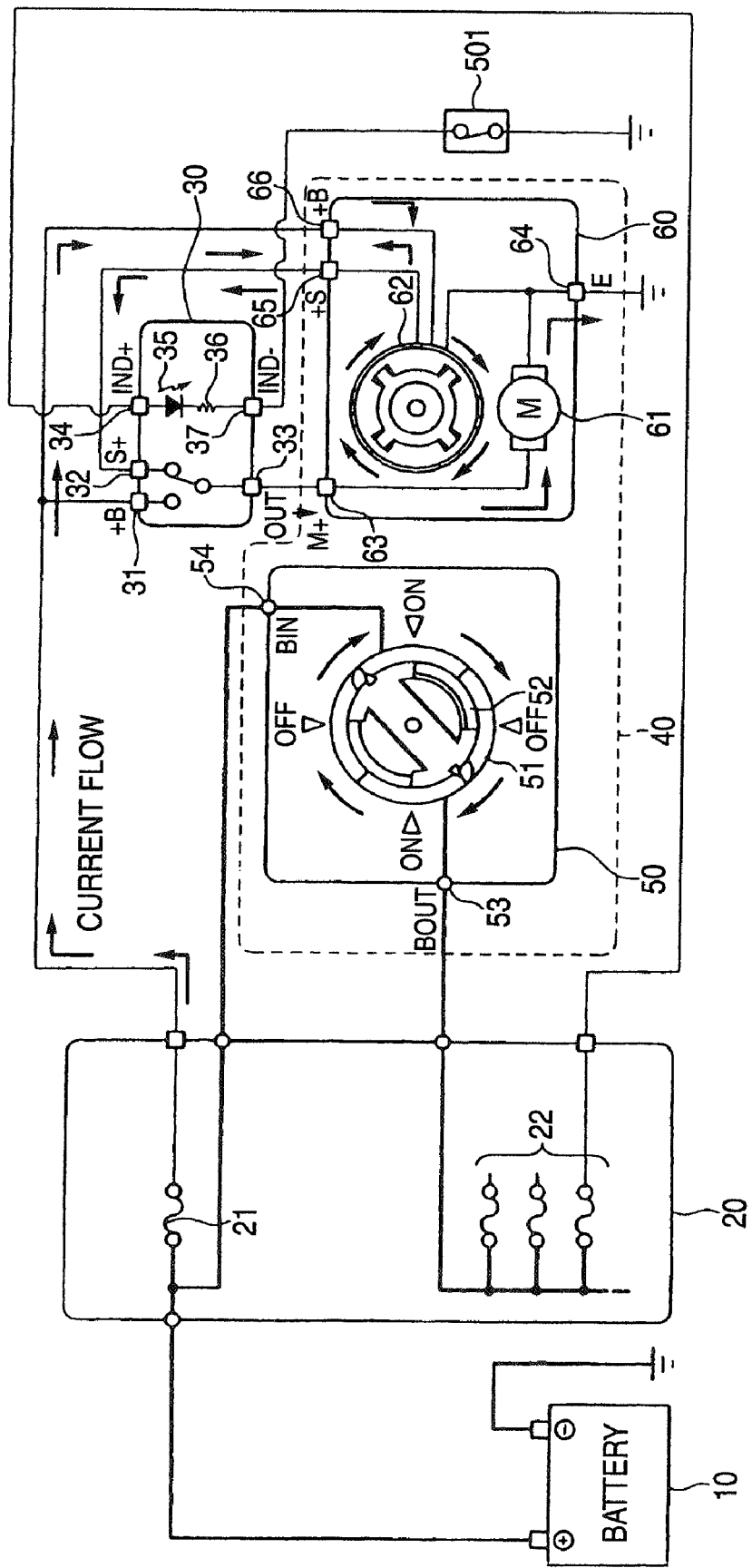
FIG. 16 is a drawing which shows a state of the second embodiment of the power supply interrupting apparatus according to the invention which results when the one-push SW has been operated (off→on).
Figure 17:
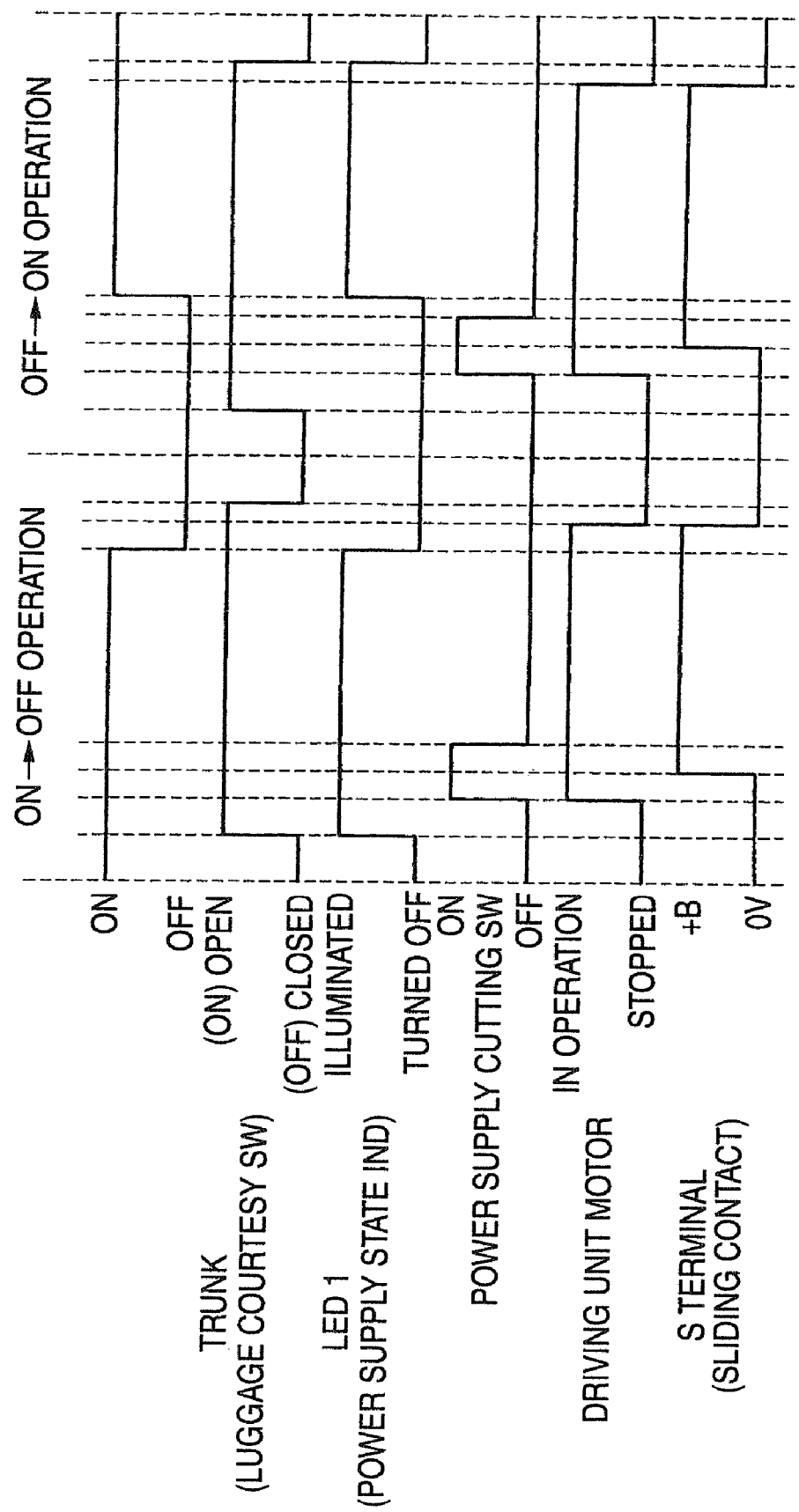
FIG. 17 is an enlarged view of a driving unit of the second embodiment of the power supply interrupting apparatus according to the invention.

FIGS. 11 to 16 are drawings which show the configuration of a second embodiment of a power supply interrupting apparatus according to the invention, and FIG. 17 is a timing chart which shows operating timings of the power supply interrupting apparatus. In addition, FIGS. 11 to 16 show the states of the power supply interrupting apparatus at those operation timings, respectively. Note that like reference numerals will be imparted to like constituent elements of the second embodiment to those of the first embodiment that have been described above, so as to simply or omit the description thereof.

A power supply interrupting apparatus according to a second embodiment is such that an indication function of the on/off state of the power supply through illumination is added to the power supply interrupting apparatus of the first embodiment, and as a configuration to make that happen, a primary LED (that is, Light Emitting Diode) 35 and a primary resistor 36, which are connected in series, are disposed between an IND+ terminal 34 and an IND+ terminal 37 of the one-push SW 30, and a luggage compartment (trunk or boot) courtesy SW 501 is disposed between the IND– terminal 37 and a GND. An onboard battery 10, a power supply box 20 and a power supply cutting electric SW 40 of this apparatus remain the same as those of the first embodiment in terms of configurations thereof.

The current of the onboard battery 10 is supplied to the IND+ terminal 34 of the one-push SW 30 via power supply cutting fuses 22 accommodated in the power supply box 20, and the current flows then in the order: the IND+ terminal 34→the primary LED 35→the primary resistor 36→the terminal 37→the luggage courtesy SW 501→GND.

The luggage courtesy SW 501 is a door SW for a luggage compartment (a trunk) and is switched "ON" when a trunk lid is opened and is switched "OFF" when the trunk lid is closed. The luggage courtesy SW 501 is inserted so as to limit the illumination period of the primary LED 35 only to the time when a vehicle is parked by making use of its sensor function to thereby reduce the consumption of dark current by the primary LED 35. Consequently, the primary LED 35 is illuminated only when a contact unit 50 of the power supply cutting electric SW 40 is on and the luggage courtesy SW 501 is on. Note that in place of the luggage courtesy SW 501, a glove box SW or a door SW can be used.

Next, the operation of this apparatus will be described below.

Figure 11:
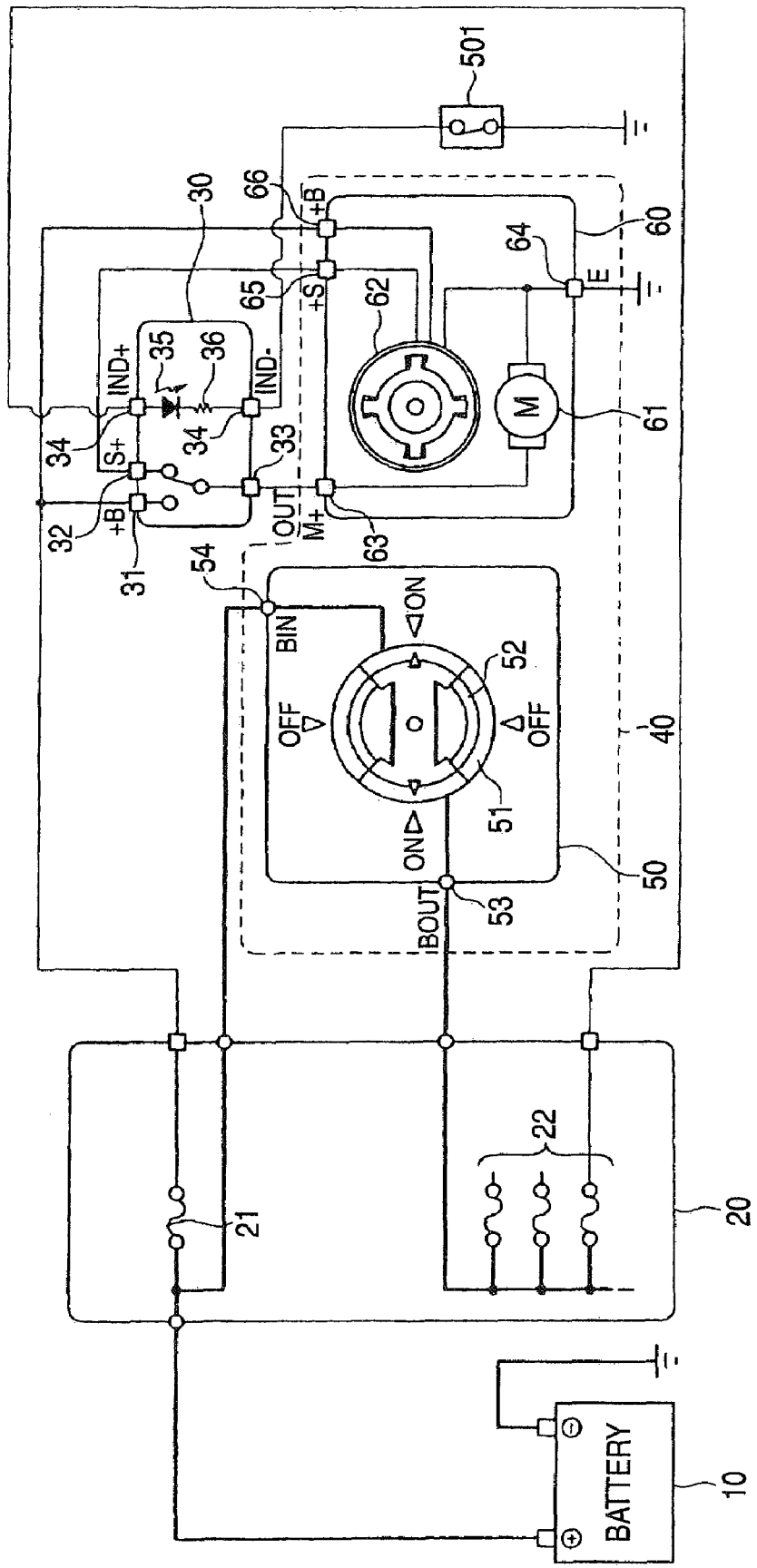
FIG. 11 is a drawing which shows a state of a second embodiment of a power supply interrupting apparatus according to the invention which results before the apparatus is operated.

FIG. 11 shows a state of the power supply interrupting apparatus before the one-push SW 30 is operated. States of a motor 61, an interlock SW 62 and a contact unit 50 which result in the same as those shown in FIG. 1, the current from the onboard battery 10 flows in the order: the onboard battery 10→the power supply box 20→the contact unit 50→the power supply box 20→power supply cutting fuse group 22 and then continues to flow along a path in the order: the power supply cutting fuse group 22→the IND+ terminal 34→the primary LED 35→the primary resistor 36→the IND– terminal 37→the luggage courtesy SW 501→GND. However, the primary LED 35 is not illuminated until the vehicle is parked and the luggage courtesy SW 501 is on.

Figure 12:
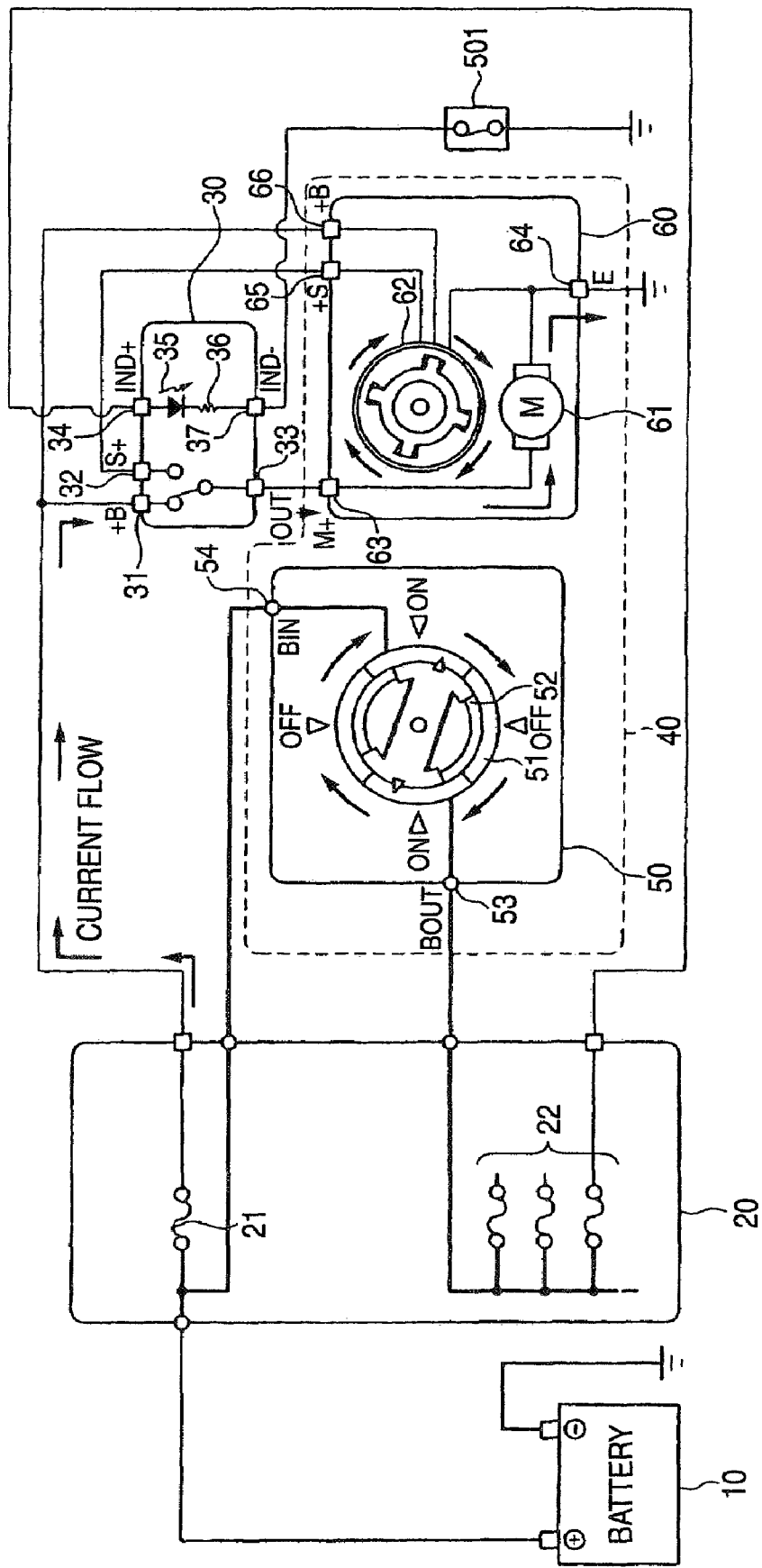
FIG. 12 is a drawing which shows a state of the second embodiment of the power supply interrupting apparatus according to the invention which results when a one-push SW is operated (on→off).

FIG. 12 shows a state of the apparatus resulting when the one-push SW 30 is operated to switch the contacts. States of the motor 61, the interlock SW 62 and the contact unit 50 which result then are the same as those shown in FIG. 2, the contact unit 50 being in the on state. Due to this, the primary LED 35 is illuminated when the luggage courtesy SW 501 is on.

Figure 13:
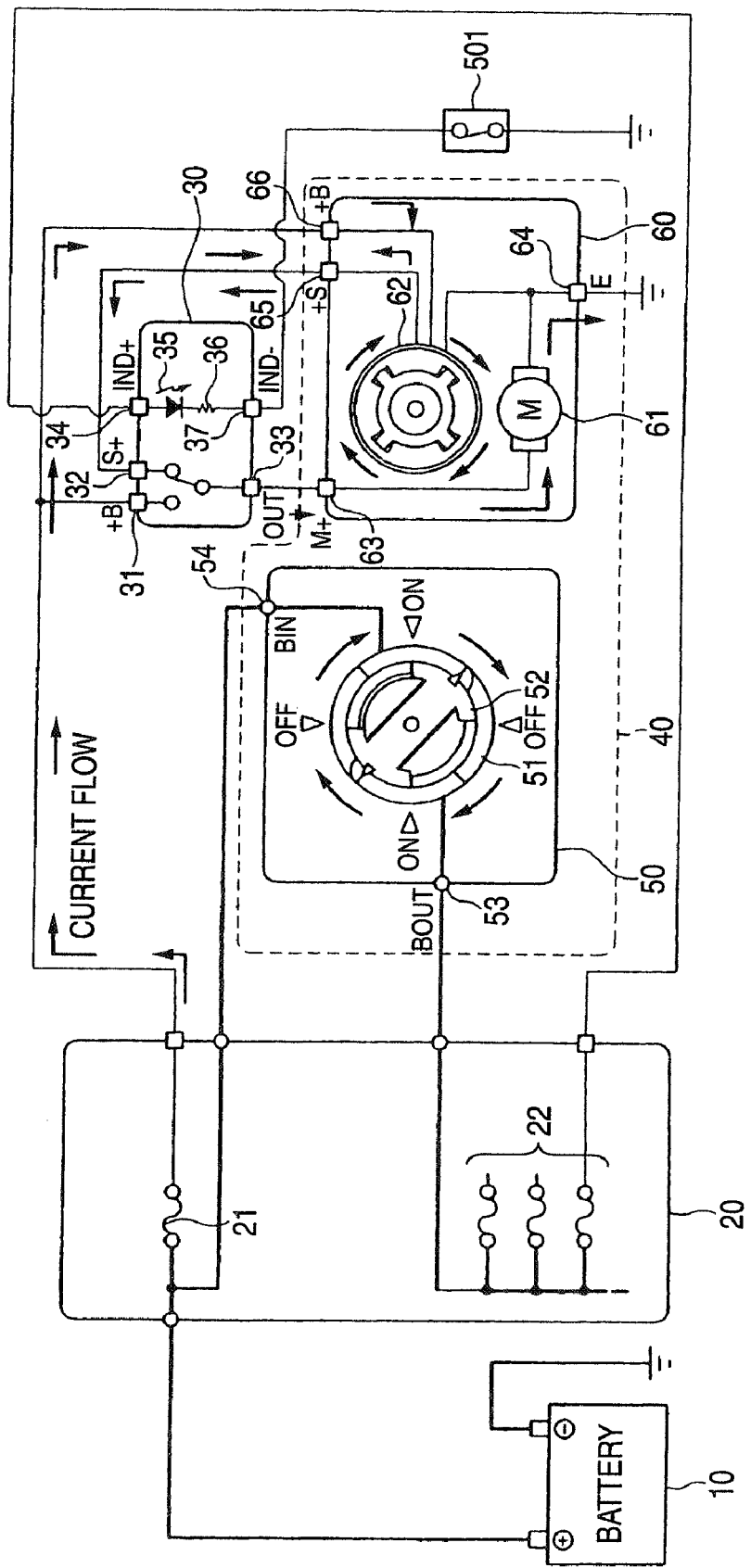
FIG. 13 is a drawing which shows a state of the second embodiment of the power supply interrupting apparatus according to the invention which results when the one-push SW has been operated (on→off).

FIG. 13 shows the state of the apparatus resulting when contacts are being switched after the operation of the one-push SW 30 has been completed. States of the motor 61, the interlock SW 62 and the contact unit 50 which result then are the same as those shown in FIG. 3, the contact unit 50 being still in the on state. Due to this, the primary LED 35 is illuminated when the luggage courtesy SW 501 is on.

Figure 14:
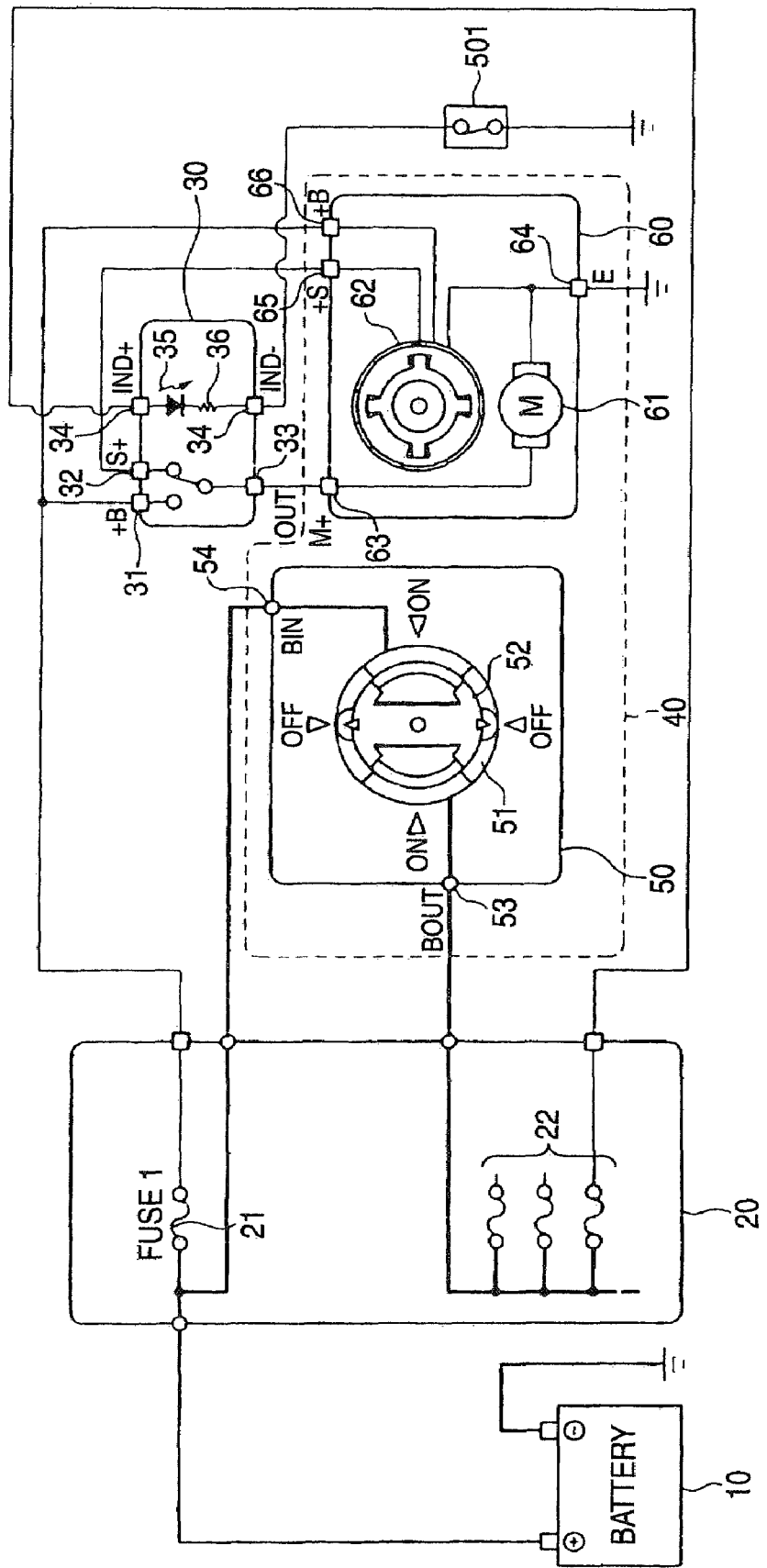
FIG. 14 is a drawing which shows a state of the second embodiment of the power supply interrupting apparatus according to the invention which results when the operation of the apparatus has been completed (on→off).

FIG. 14 shows a state of the apparatus resulting when the contact switching operation has been completed, and similar to what is shown in FIG. 4, the motor 61 stops and the interlock SW 62 and the contact 50 have rotated one fourth the circumference thereof from the state shown in FIG. 11. As this occurs, the contact unit 50 turns off, whereby the feed to the primary LED 35 is stopped. Due to this, the primary LED 35 is not illuminated even though the luggage courtesy SW 501 is on.

FIG. 15 shows a state of the apparatus resulting when the one-push SW 30 is pushed again to resume the power supply from the onboard battery 10. States of the motor 61, the interlock SW 62 and the contact unit 50 are the same as those shown in FIG. 5, and the contact unit 50 is switched from off to on. Due to this, the primary LED 35 is illuminated when the luggage courtesy SW 501 is on.

FIG. 16 shows a state of the apparatus resulting when the contacts are in the process of switching after the operation of the one-push SW 30 has been completed. States of the motor 61, the interlock SW 62 and the contact unit 50 which result at that time are the same as those shown in FIG. 6, the contact unit 50 being in the on state. Due to this, the primary LED 35 is illuminated when the luggage courtesy SW 501 is on.

When the motor 61 rotates further and the interlock SW 62 and a rotor 52 of the contact unit 50 rotate one fourth the circumference thereof from the position shown in FIG. 14, the motor 61 stops rotating and the contact switching operation is completed. States of the motor 61, the interlock SW 62 and the contact unit 50 resulting then are the same as those shown in FIG. 11, and the primary LED 35 is illuminated when the luggage courtesy SW 501 is on.

The timing chart shown in FIG. 17 illustrates operation timings of the power supply interrupting apparatus. The primary LED 35 is illuminated only when the contact unit 50 is on and the trunk lid is opened.

Thus, in the power supply interrupting apparatus, the power supply cutting state of the vehicle can be indicated by the LED 35, whereby the user can confirm the power supply cutting state immediately from the indication by the LED 35. In addition, the consumption of dark current in association with the indication by the LED 35 can be suppressed by connecting it to the luggage courtesy SW 501.

Third Embodiment

Figure 22:
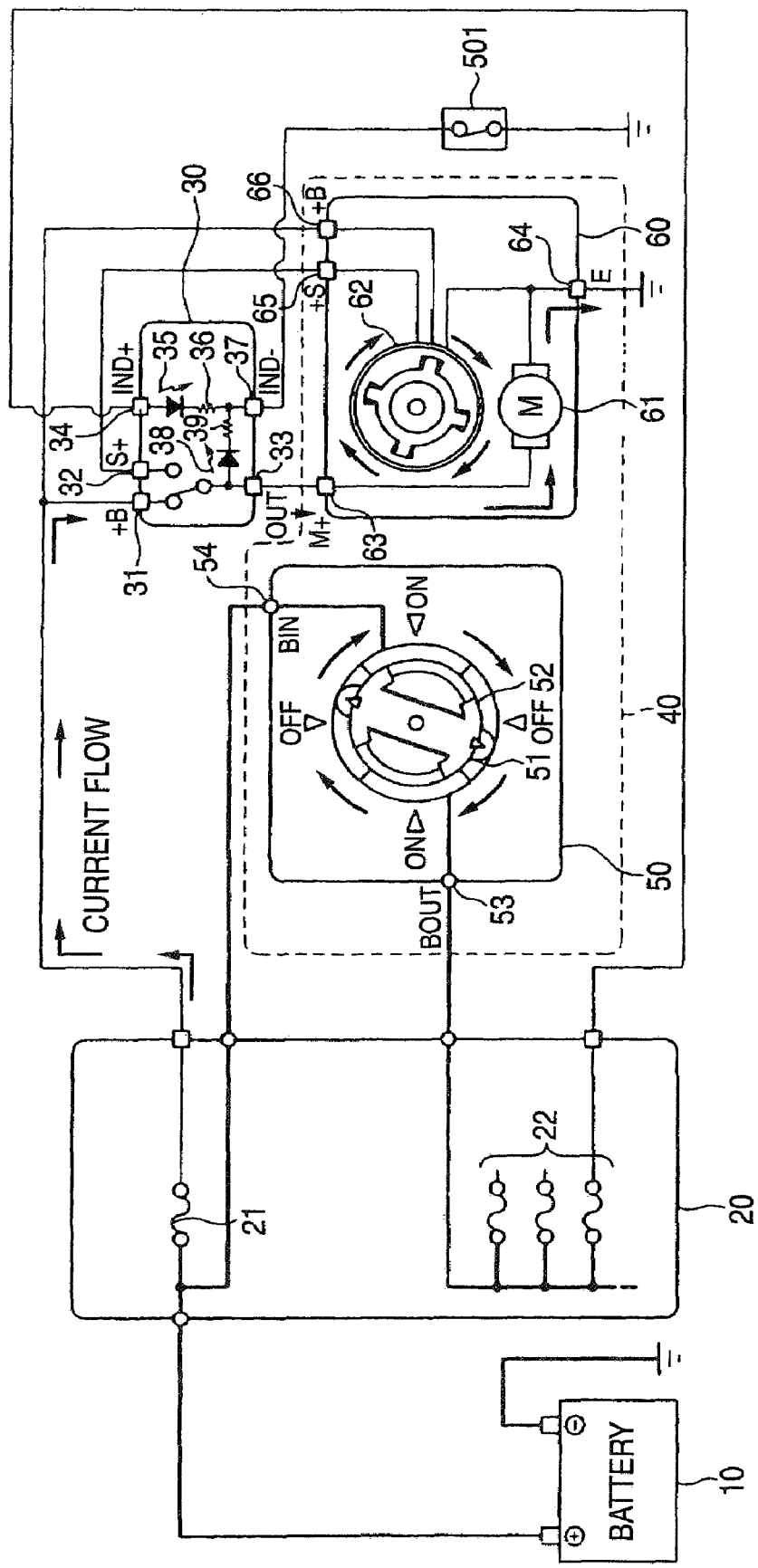
FIG. 22 is a drawing which shows a state of the third embodiment of the power supply interrupting apparatus according to the invention which results when the one-push SW is operated (off→on).
Figure 23:
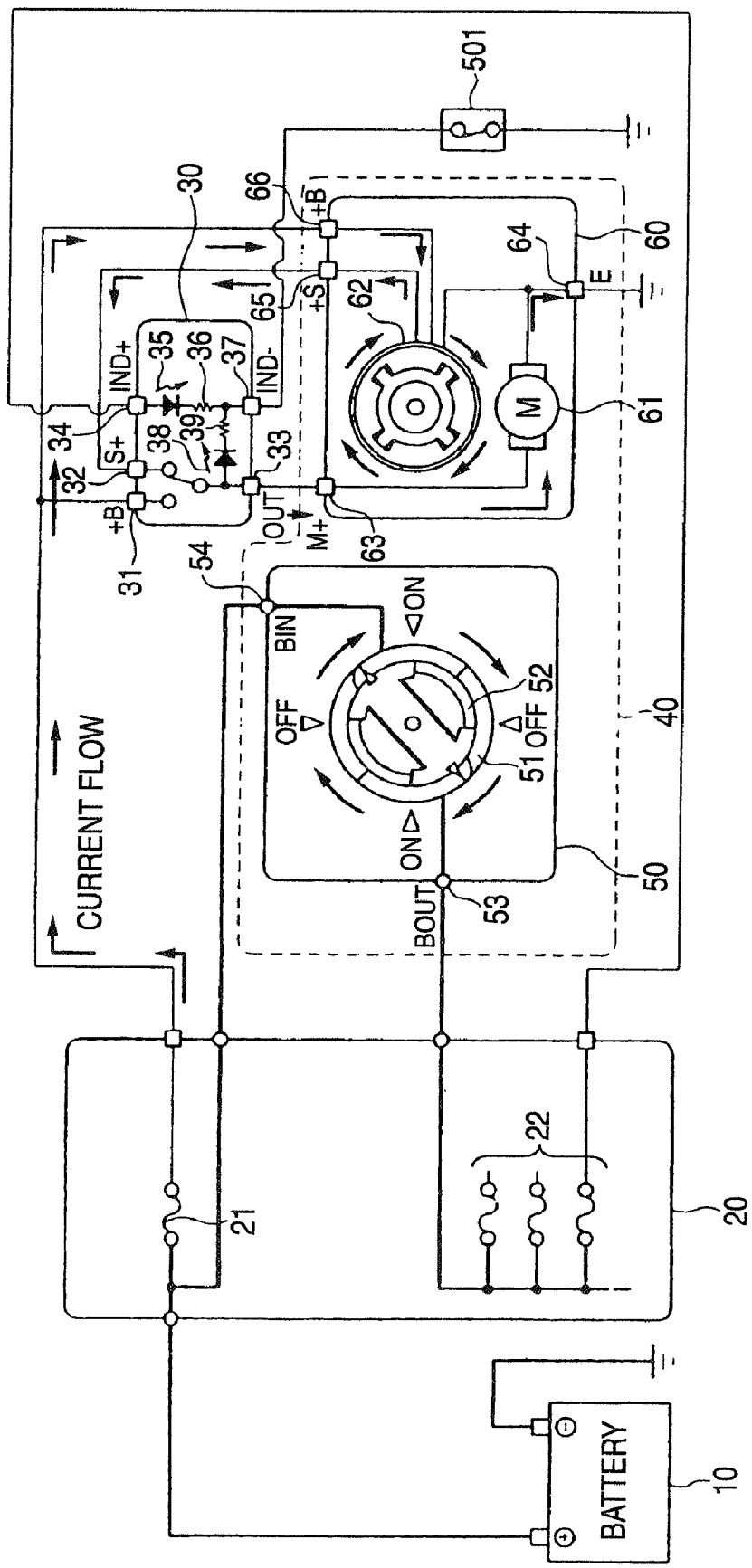
FIG. 23 is a drawing which shows a state of the third embodiment of the power supply interrupting apparatus according to the invention which results when the one-push SW has been operated (off→on).
Figure 24:
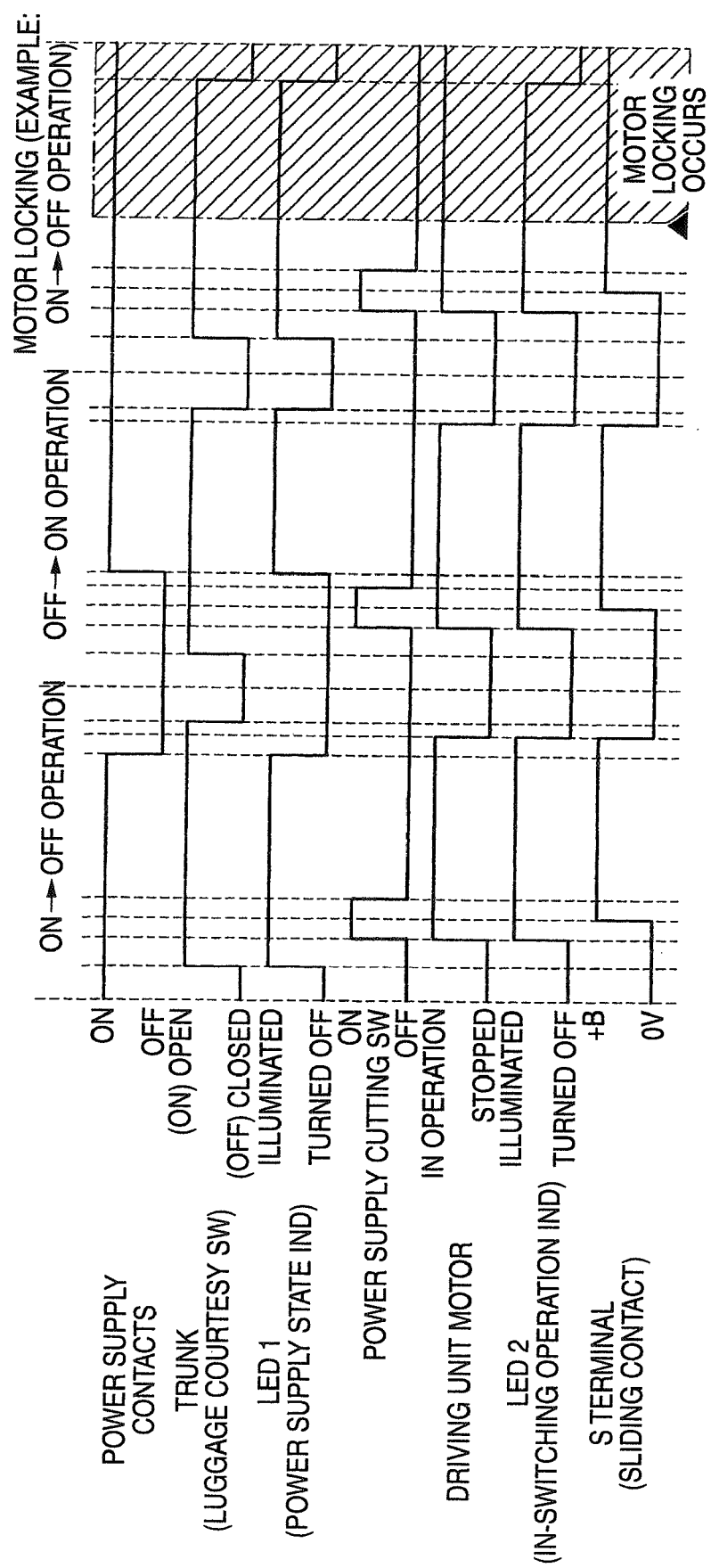
FIG. 24 is an enlarged view of a driving unit of the third embodiment of the power supply interrupting apparatus according to the invention.
Figure 25:
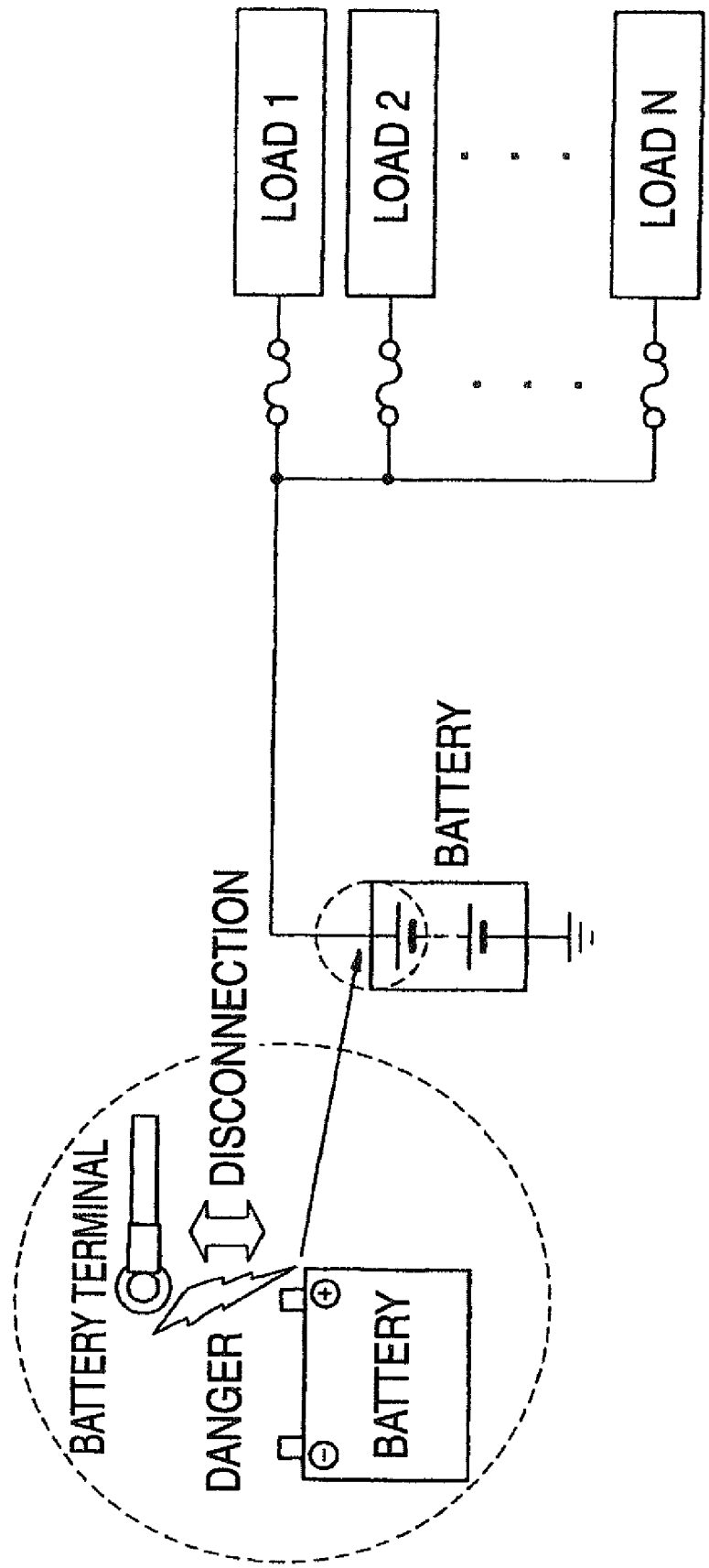
FIG. 25 is a drawing which shows a conventional method for disconnecting a terminal of a battery.
Figure 26:
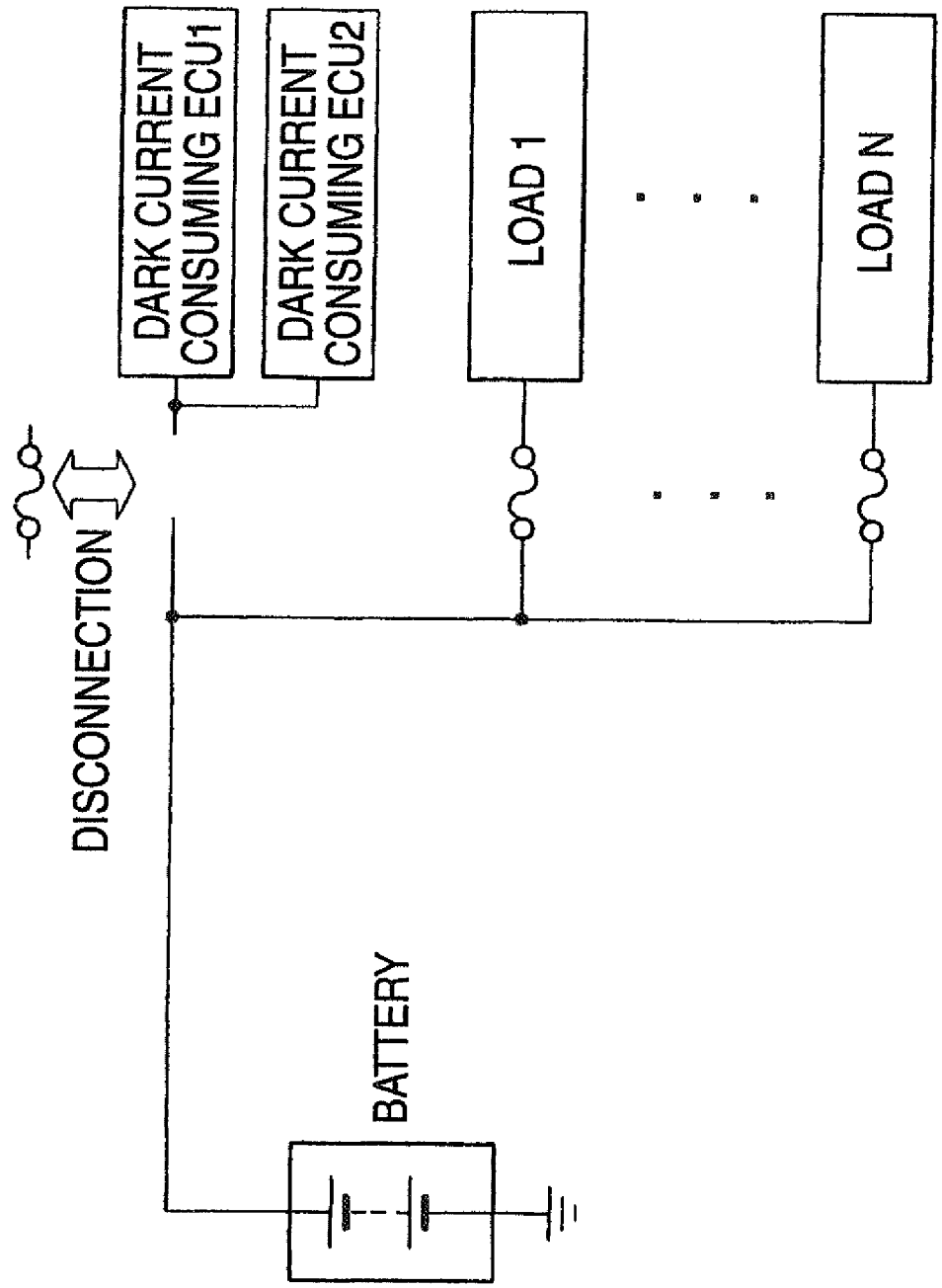
FIG. 26 is a drawing which shows a conventional method for removing a fuse.

FIGS. 18 to 23 are drawings which show the configuration of a third embodiment of a power supply interrupting apparatus according to the invention, and FIG. 24 shows operating timings of the power supply interrupting apparatus. In addition, FIGS. 18 to 23 show the states of the power supply interrupting apparatus at those operation timings, respectively. Note that like reference numerals will be imparted to like constituent elements of the third embodiment to those of the first embodiment and second embodiment that have been described above, so as to simplify or omit the description thereof.

A power supply interrupting apparatus according to a third embodiment is a function to indicate through illumination the state of a power supply cutting electric SW 40 for confirmation is added to the power supply interrupting apparatus of the second embodiment, and as assurance, a secondary LED 38 and a secondary resistor 39, which are connected in series, are disposed in a one-push SW 30, and the secondary LED 38 side is connected to an OUT terminal 33 while the secondary resistor 39 side is connected to an IND– terminal 37 of the one-push SW 30. The configuration of the remaining part of this embodiment remains the same as that of the second embodiment.

The one-push SW 30 outputs a current inputted from either a +B terminal 31 or an S+ terminal 32 to the power supply cutting electric SW 40 via the OUT terminal 33 while a contact switching operation is being performed, and the power supply cutting electric SW 40 drives a motor 61 by the current output, so as to rotate an interlock SW 62 and a rotor 52 of a contact unit 50.

In this apparatus, part of the current outputted from the OUT terminal 33 to the power supply cutting electric SW 40 is branched so as to flow in the order: the primary LED 38→the secondary resistor 39→the IND− terminal 37→a luggage courtesy SW 501→GND. Consequently, the secondary LED 38 is illuminated when the driving current is supplied to the power supply cutting electric SW 40 and the luggage courtesy SW 501 is on, and is turned off when the current supply to the power supply cutting electric SW 40 is stopped when the operation of the power supply cutting electric SW 40 is stopped.

In the event that the power supply cutting electric SW 40 fails and hence the operation thereof is not stopped, the user can recognize the failure of the power supply cutting SW 40 if the secondary LED 38 continues to be illuminated.

Note that a glove box SW or a door SW can be used in place of the luggage courtesy SW 501.

Next, the operation of the apparatus will be described below.

Figure 18:
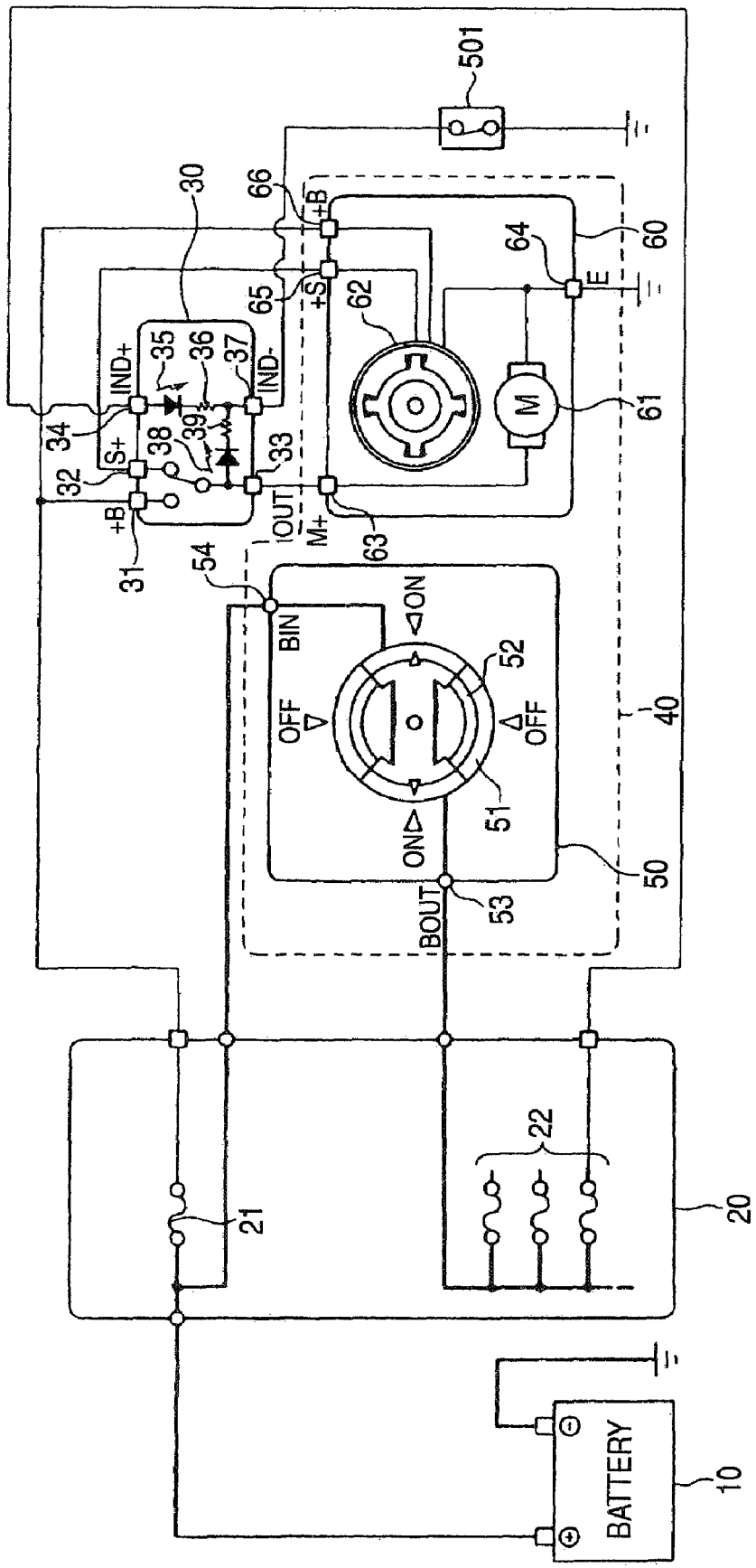
FIG. 18 is a drawing which shows a state of a third embodiment of a power supply interrupting apparatus according to the invention which results before the apparatus is operated.

FIG. 18 shows a state of the power supply interrupting apparatus resulting before the one-push SW 30 is operated. States of the one-push SW 30 and the power supply cutting SW 40 result in the same as those shown in FIG. 1, and no current flows from the OUT terminal 33 of the one-push SW 30 to an M+ terminal 63 of a driving unit 60. Due to this, the secondary LED 38 is not illuminated.

Figure 19:
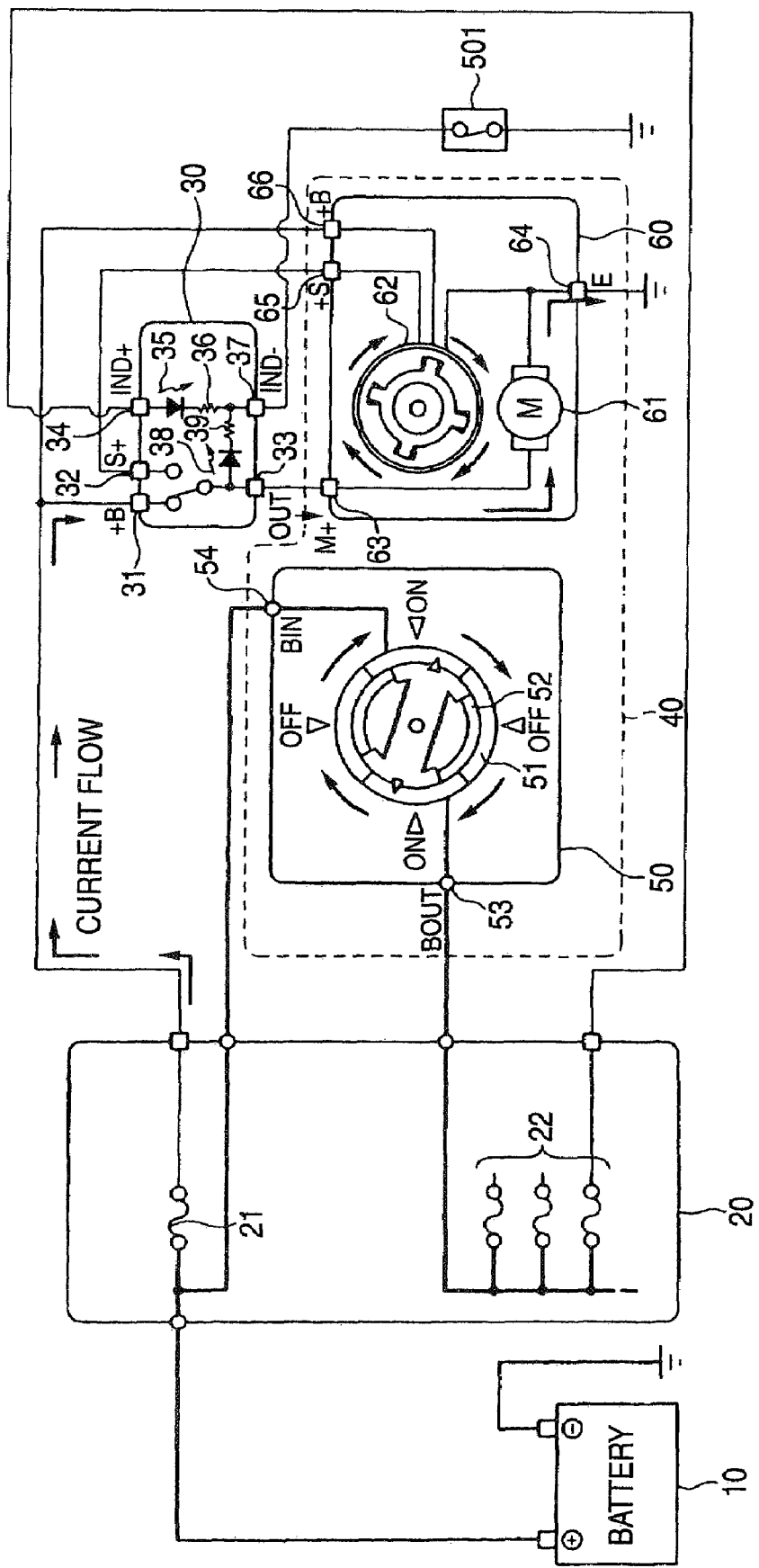
FIG. 19 is a drawing which shows a state of the third embodiment of the power supply interrupting apparatus according to the invention which results when a one-push SW is operated (on→off).

FIG. 19 shows a state of the apparatus when the one-push SW 30 is operated to switch contacts. States of the one-push SW 30 and the power supply cutting SW 40 resulting then are the same as those shown in FIG. 2, and the current inputted from the B+ terminal 31 of the one-push SW 30 is outputted to the power supply cutting electric SW 40 via the OUT terminal 33, and due to this, the secondary LED 38 is illuminated when the luggage courtesy SW 501 is on.

Figure 20:
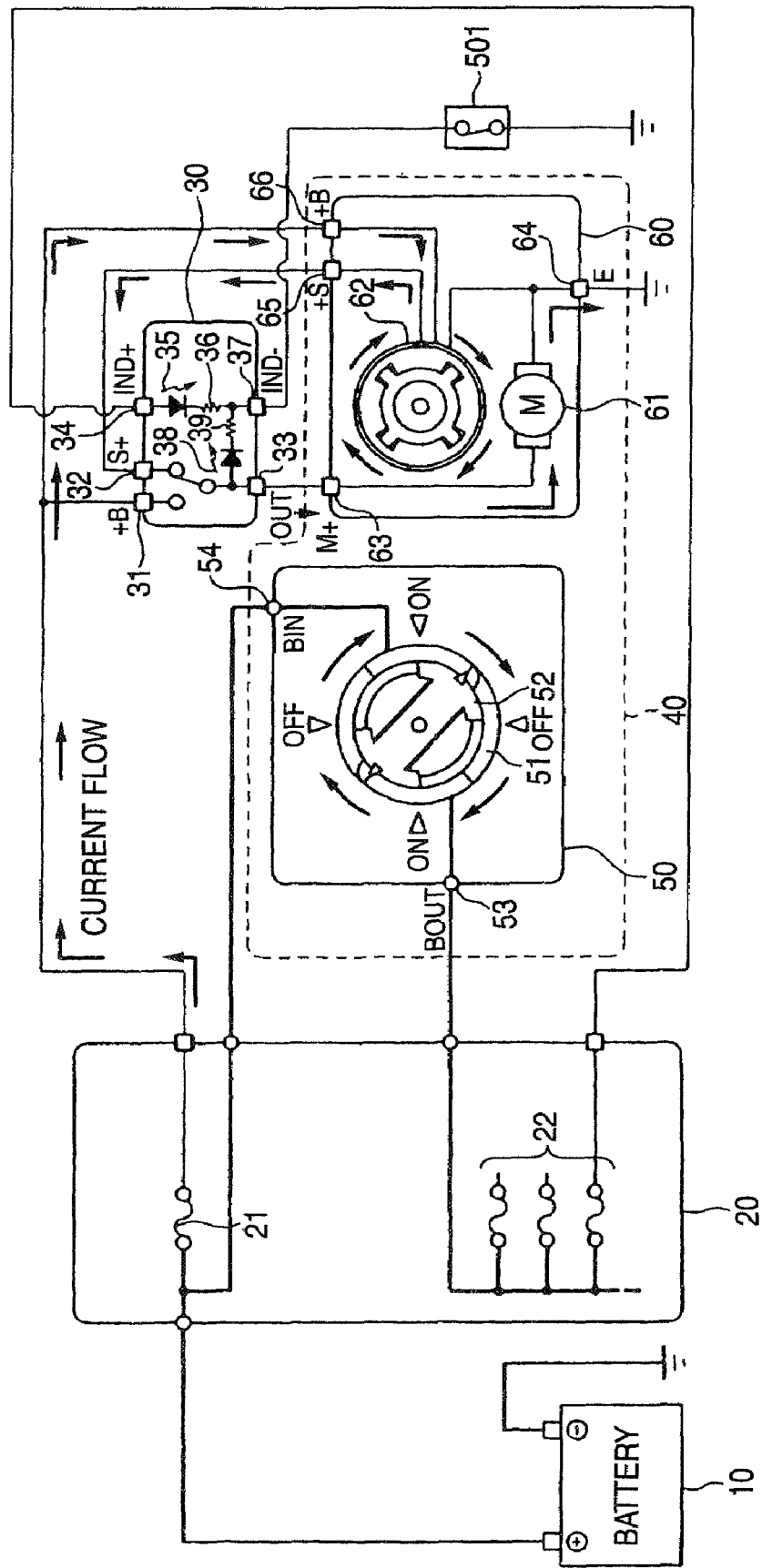
FIG. 20 is a drawing which shows a state of the third embodiment of the power supply interrupting apparatus according to the invention which results when the one-push SW has been operated (on→off).

FIG. 20 shows a state of the apparatus while contacts are being switched after the operation of the one-push SW 30 has been completed. States of the one-push SW 30 and the power supply cutting SW 40 resulting then are the same as those shown in FIG. 3, and the current inputted from the S+ terminal 32 of the one-push SW 30 is outputted to the power supply cutting SW 40 via the OUT terminal 33, due to this, the secondary LED 38 is kept illuminated when the luggage courtesy SW 501 is on.

Figure 21:
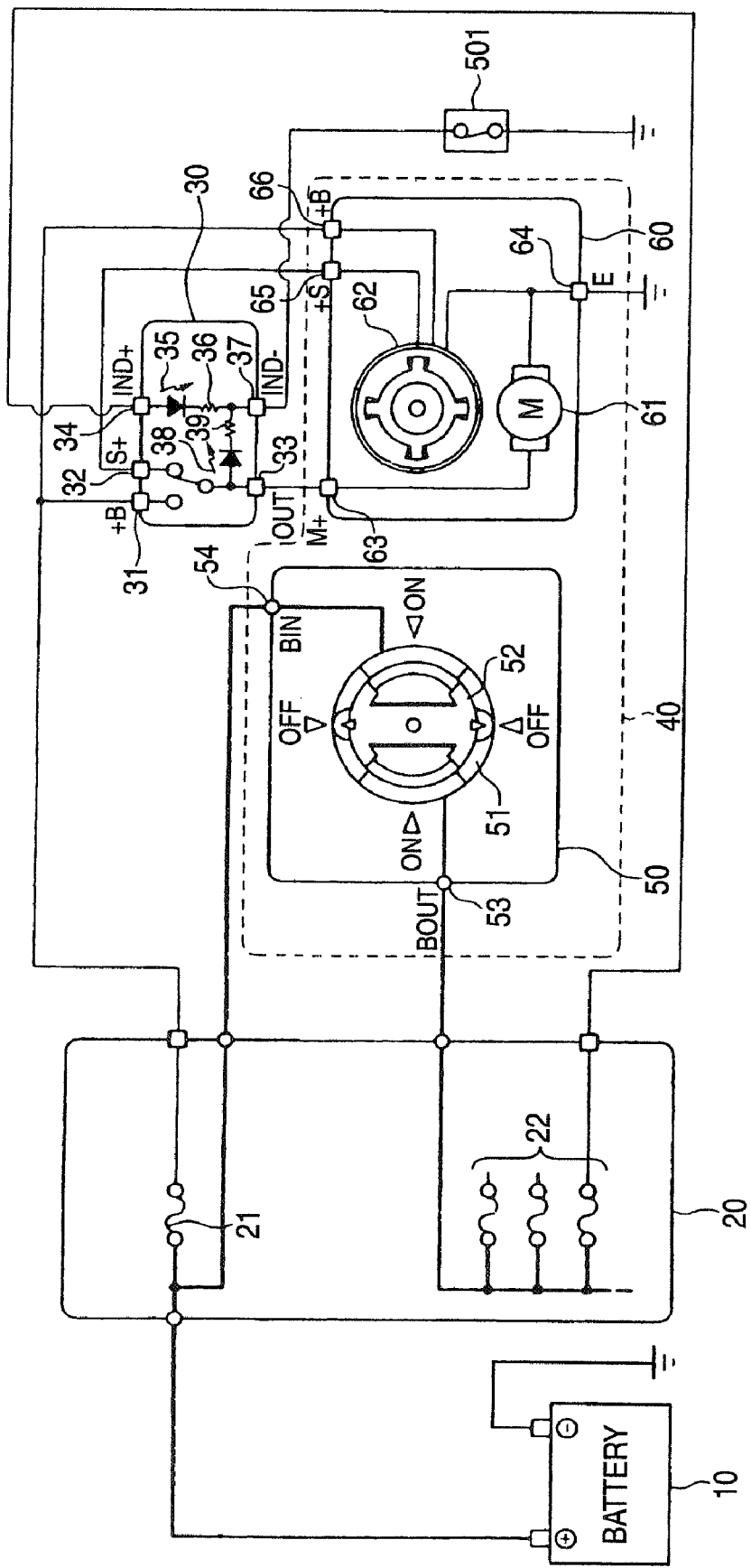
FIG. 21 is a drawing which shows a state of the third embodiment of the power supply interrupting apparatus according to the invention which results when the operation of the apparatus has been completed (on→off).

FIG. 21 shows a state of the apparatus resulting when the contact switching operation has been completed. States of the one-push SW 30 and the power supply cutting SW 40 resulting then are the same as those shown in FIG. 4, no current flows from the OUT terminal 33 of the one-push SW 30 to the power supply cutting electric SW 40. Due to this, the secondary LED 38 is turned off.

In the event that the secondary LED 38 is turned off yet even after a certain period of time (spent switching the power supply cutting electric SW 40 from on to off) has elapsed after the one-push SW 30 was operated, there exists a possibility that the power supply is not cut due to a failure occurring in, for example, a locking mechanism of the power supply cutting electric SW 40 for stopping the operation in the middle. Thus, the state of the power supply cutting electric SW 40 can be grasped by verifying the secondary LED 38.

FIG. 22 shows a state resulting when the one-push SW 30 is pushed again to resume the current supply from the onboard battery 10. States of the one-push SW 30 and the power supply cutting SW 40 resulting then are the same as those shown in FIG. 5, and the current inputted from the +B terminal 31 of the one-push SW 30 is output to the power supply cutting electric SW 40 via the OUT terminal 33, and due to this, the secondary LED 38 is illuminated when the luggage courtesy SW 501 is on.

FIG. 23 shows a state of the apparatus resulting when the contacts are being switched after the operation of the one-push SW 30 has been completed. States of the one-push SW 30 and the power supply cutting SW 40 resulting then are the same as those shown in FIG. 6, and the current inputted from the S+ terminal 32 of the one-push SW 30 is output to the power supply cutting electric SW 40 via the OUT terminal 33. Due to this, the secondary LED 38 being kept illuminated when the luggage courtesy SW 501 is on.

When a motor 61 rotates further, and an interlock SW 62 and a rotor 52 of a contact unit 50 have rotated one fourth the circumference thereof from their positions shown in FIG. 21, the motor 61 stops rotating, and the contact switching operation is completed. States of the one-push SW 30 and the power supply cutting SW 40 resulting then are the same as those shown in FIG. 18, and the flow of current from the one-push SW 30 to the power supply cutting SW 40 is stopped, and the secondary LED 38 is turned off.

In the event that the secondary LED 38 is turned off yet even after the certain period of time (spent switching the power supply cutting electric SW 40 from on to off) has elapsed after the one-push SW 30 was operated, there exists a possibility that a current of a specific current value is not supplied to the ECU due to a failure occurring in a locking mechanism of the power supply cutting electric SW 40. Thus, the state of the power supply cutting electric SW 40 can be grasped by verifying the secondary LED 38.

The timing chart in FIG. 24 illustrates the operation timings of the power supply interrupting apparatus. With the trunk lid opened, the secondary LED 38 is illuminated when the one-push SW 30 is pushed and is turned off when the voltage of the +S terminal 65 of a driving unit 60 becomes 0 after a certain period of time has elapsed after the motor 61 stops. In the event that a motor locking occurs, however, the secondary LED 38 is not turned off even after the certain period of time has elapsed after the one-push SW 30 was operated.

Thus, according to the power supply interrupting apparatus, the failure of the power supply cutting electric SW 40 can be verified immediately from the indication by the LED 38. In addition, the consumption of dark current in association with the indication by the LED 38 can be suppressed by connecting it to a luggage courtesy SW 501.

Note that while in the embodiment, the primary LED 35 for indicating the on/off of the power supply and the secondary LED 38 for indicating the driving state of the power supply cutting SW 40 are provided. A mode may, needless to say, be adopted in which only the secondary LED 38 is provided.

Thus, as has been described heretofore, the power supply interrupting apparatus of the invention can be applied widely to various types of vehicles as an apparatus which provides a superior operability in interrupting dark current or the like of the onboard battery or the like.

What is claimed is:

1. A power supply interrupting apparatus for interrupting a current supplied from a battery, comprising:
 a switch, for switching between a first connection and a second connection, the first connection being between a primary terminal and an output terminal, the primary terminal being fed, when an operating portion is operated, and the second connection being between a secondary terminal and the output terminal, when the operation of the operating portion is released;

a motor, which is driven by a current outputted from the output terminal;

an interlock switch, which is driven to rotate by the motor so as to choose to feed or not to feed to the secondary terminal in accordance with a resultant rotational angle; and a contact unit, which is driven to rotate by the motor so as to switch the state of a current supplied from the battery to an interrupted or non-interrupted state;

wherein the motor is continuously driven from a time when the primary terminal is connected to the output terminal to a time when the interlock switch chooses not to feed to the secondary terminal in case that the operating portion of the switch is operated; and the contact unit switches the state of the current supplied from the battery from the non-interrupted state to the interrupted state or from the interrupted state to the non-interrupted state while the motor is being driven continuously.

2. The power supply interrupting apparatus according to claim 1, further comprising:

a primary indicator, which is illuminated by a current supplied from the battery via the contact unit.

3. The power supply interrupting apparatus according to claim 1, further comprising:

a secondary indicator, which is illuminated by a branch current of a current outputted to the output terminal of the switch.

4. The power supply interrupting apparatus according to claim 2, wherein a switch, not to be on at any other time than when a vehicle is parked, is connected in series to the primary indicator or the secondary indicator.

5. The power supply interrupting apparatus according to claim 3, wherein a switch, not to be on at any other time than when a vehicle is parked, is connected in series to the primary indicator or the secondary indicator.

6. The power supply interrupting apparatus according to claim 1, wherein the contact unit comprises:

a stator; and a rotor;

wherein the rotor is rotated together with the interlock switch when the motor drives each of the interlock switch and the contact unit.

* * * * *